United States Patent
Hong et al.

(10) Patent No.: US 12,032,787 B2
(45) Date of Patent: Jul. 9, 2024

(54) SENSOR DEVICE

(71) Applicant: SAMSUNG DISPLAY CO., LTD., Yongin-si (KR)

(72) Inventors: Jin Taek Hong, Yongin-si (KR); Ja Seung Ku, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/135,625

(22) Filed: Apr. 17, 2023

(65) Prior Publication Data

US 2024/0069674 A1 Feb. 29, 2024

(30) Foreign Application Priority Data

Aug. 30, 2022 (KR) ........................ 10-2022-0109479

(51) Int. Cl.
*G06F 3/041* (2006.01)
*G06F 3/044* (2006.01)

(52) U.S. Cl.
CPC ........ *G06F 3/04182* (2019.05); *G06F 3/0446* (2019.05)

(58) Field of Classification Search
None
See application file for complete search history.

(56) References Cited

U.S. PATENT DOCUMENTS

| 11,094,280 | B2 | 8/2021 | Jang et al. | |
|---|---|---|---|---|
| 2017/0293388 | A1* | 10/2017 | Han | G06F 3/0445 |
| 2019/0278404 | A1* | 9/2019 | Ishizaki | G02F 1/13338 |

FOREIGN PATENT DOCUMENTS

| KR | 1020210009713 A | 1/2021 |
|---|---|---|
| KR | 102379057 B1 | 3/2022 |
| KR | 1020220094119 A | 7/2022 |

* cited by examiner

*Primary Examiner* — Carl Adams
(74) *Attorney, Agent, or Firm* — CANTOR COLBURN LLP

(57) ABSTRACT

A sensor device includes: first sensors; second sensors which forms a capacitance with the first sensors; and a sensor driver which transmits driving signals to the first sensors through first sensor lines, and receives sensing signals from the second sensors through second sensor lines. The sensor driver sequentially transmits the driving signals to the first sensors, and transmits, during each period of transmitting the driving signals, an offset signal, which is identical in frequency to and different in phase from the driving signals, to at least one selected from first sensors which does not receive the driving signals among the first sensor. The sensor driver sets at least one selected from a slew rate and a voltage level of the offset signal to a value different from a corresponding value of a corresponding driving signal.

20 Claims, 13 Drawing Sheets

SENSOR DEVICE

This application claims priority to Korean patent application number 10-2022-0109479, filed on Aug. 30, 2022, and all the benefits accruing therefrom under 35 U.S.C. § 119, the content of which in its entirety is herein incorporated by reference.

BACKGROUND

1. Field

Various embodiments of the disclosure relate to a sensor device.

2. Description of the Related Art

With the development of information technology, the importance of a display device, which is a connection medium between a user and information, has been emphasized. Owing to the importance of display devices, the use of various kinds of display devices, such as a liquid crystal display device and an organic light-emitting display device, has increased.

Such a display device may include a sensor device, and may sense a touch of a user that corresponds to an image of the display device and use the sensed signal as an input signal.

SUMMARY

In a display device including a sensor device, driving signals which are supplied to sensors of the sensor device may act as noises in the display device, thus deteriorating display quality. On the other hand, signals for displaying an image on the display device may act as noises in the sensor device, thus reducing sensing sensitivity.

To avoid such electromagnetic interference (EMI), a change in frequency band of a driving signal of the sensor device has been proposed. However, because various frequency bands have been already used, it may be difficult to use an additional suitable frequency band.

Various embodiments of the disclosure are directed to a sensor device of a display device in which EMI is reduced or minimized without a change in frequency band of a driving signal of the sensor device.

An embodiment of the disclosure provides a sensor device including: first sensors; second sensors which forms a capacitance with the first sensors; and a sensor driver which transmits driving signals to the first sensors through first sensor lines, and receives sensing signals from the second sensors through second sensor lines. In such an embodiment, the sensor driver sequentially transmits the driving signals to the first sensors, and transmits, during each period of transmitting the driving signals, an offset signal to at least one of the first sensors that does not receive the driving signals, where the offset signal is identical in frequency to and different in phase from the driving signals. In such an embodiment, the sensor driver sets at least one selected from a slew rate and a voltage level of the offset signal to a value different from a corresponding value of a corresponding driving signal.

In an embodiment, a length of a first sensor line through which the corresponding driving signal is transmitted may be different from a length of a first sensor line through which the offset signal is transmitted.

In an embodiment, in a case where a first sensor line through which the offset signal is transmitted is longer than a first sensor line through which the corresponding driving signal is transmitted, the sensor driver may set the voltage level of the offset signal to be greater than a voltage level of the driving signal.

In an embodiment, for each of the first sensor lines, the sensor driver may include: a plurality of switches which receive different driving voltages; a first transistor including a first electrode connected to the plurality of switches; a second transistor including a first electrode connected to a second electrode of the first transistor, and a second electrode which receive a reference voltage; and a gate controller connected to a gate electrode of the first transistor and a gate electrode of the second transistor.

In an embodiment, in a case where a first sensor line through which the offset signal is transmitted is longer than a first sensor line through which the corresponding driving signal is transmitted, the sensor driver may set the slew rate of the offset signal to be greater than a slew rate of the driving signal.

In an embodiment, for each of the first sensor lines, the sensor driver may include: a first transistor including a first electrode which receives a driving voltage; a second transistor including a first electrode connected to a second electrode of the first transistor, and a second electrode which receives a reference voltage; and a gate controller connected to a gate electrode of the first transistor and a gate electrode of the second transistor. In such an embodiment, the first transistor may include a plurality of sub-transistors connected in parallel to each other, and the second transistor may include a plurality of sub-transistors connected in parallel to each other.

In an embodiment, in a case where a first sensor line through which the offset signal is transmitted is longer than a first sensor line through which the corresponding driving signal is transmitted, the sensor driver may set the voltage level of the offset signal to be greater than a voltage level of the driving signal, and may set the slew rate of the offset signal to be greater than a slew rate of the driving signal.

In an embodiment, for each of the first sensor lines, the sensor driver may include: a plurality of switches which receives different driving voltages, respectively; a first transistor including a first electrode connected to the plurality of switches; a second transistor including a first electrode connected to a second electrode of the first transistor, and a second electrode which receives a reference voltage; and a gate controller connected to a gate electrode of the first transistor and a gate electrode of the second transistor. In such an embodiment, the first transistor may include a plurality of sub-transistors connected in parallel to each other, and the second transistor may include a plurality of sub-transistors connected in parallel to each other.

In an embodiment, among the first sensors, a first sensor to which the offset signal is transmitted may be a sensor farthest from a first sensor to which the corresponding driving signal is transmitted.

In an embodiment, a first sensor to which the offset signal is transmitted may be a first one or the last one among the first sensors.

An embodiment of the disclosure provides a sensor device including: sensors; and a sensor driver which transmits driving signals to at least two sensors among the sensors through sensor lines, and receives sensing signals from other sensors adjacent to the sensors to which the driving signals are transmitted. In such an embodiment, the sensor driver transmits, during each period or transmitting the driving signals, an offset signal to at least one selected from sensors which neither receive the driving signals nor transmit the sensing signals among the sensors, where the offset signal is identical in frequency to and different in phase from the driving signals. In such an embodiment, the sensor driver sets at least one selected from a slew rate and a voltage level of the offset signal to a value different from a corresponding value of a corresponding driving signal.

In an embodiment, a length of a sensor line through which the corresponding driving signal is transmitted may be different from a length of a sensor line through which the offset signal is transmitted.

In an embodiment, in a case where a sensor line through which the offset signal is transmitted is longer than a sensor line through which the corresponding driving signal is transmitted, the sensor driver may set the voltage level of the offset signal to be greater than a voltage level of the driving signal.

In an embodiment, for each of the sensor lines, the sensor driver may include: a plurality of switches which receives different driving voltages, respectively; a first transistor including a first electrode connected to the plurality of switches; a second transistor including a first electrode connected to a second electrode of the first transistor, and a second electrode which receives a reference voltage; and a gate controller connected to a gate electrode of the first transistor and a gate electrode of the second transistor.

In an embodiment, in a case where a sensor line through which the offset signal is transmitted is longer than a sensor line through which the corresponding driving signal is transmitted, the sensor driver may set the slew rate of the offset signal to be greater than a slew rate of the driving signal.

In an embodiment, for each of the sensor lines, the sensor driver may include: a first transistor including a first electrode which receives a driving voltage; a second transistor including a first electrode connected to a second electrode of the first transistor, and a second electrode which receives a reference voltage; and a gate controller connected to a gate electrode of the first transistor and a gate electrode of the second transistor. In such an embodiment, the first transistor may include a plurality of sub-transistors connected in parallel to each other, and the second transistor may include a plurality of sub-transistors connected in parallel to each other.

In an embodiment, in a case where a sensor line through which the offset signal is transmitted is longer than a sensor line through which the corresponding driving signal is transmitted, the sensor driver may set the voltage level of the offset signal to be greater than the voltage level of the driving signal, and may set the slew rate of the offset signal to be greater than the slew rate of the driving signal.

In an embodiment, for each of the sensor lines, the sensor driver may include: a plurality of switches which receives different driving voltages, respectively; a first transistor including a first electrode connected to the plurality of switches; a second transistor including a first electrode connected to a second electrode of the first transistor, and a second electrode which receives a reference voltage; and a gate controller connected to a gate electrode of the first transistor and a gate electrode of the second transistor. In such an embodiment, the first transistor may include a plurality of sub-transistors connected in parallel to each other, and the second transistor may include a plurality of sub-transistors connected in parallel to each other.

In an embodiment, a distance between a sensor which receives the offset signal and a sensor which transmits the sensing signal may be greater than a distance between a sensor which receives the corresponding driving signal and the sensor which transmits the sensing signal.

In an embodiment, no sensor may be located between the sensor which receives the corresponding driving signal and the sensor which transmits the sensing signal. In such an embodiment, no sensor may be located between the sensor which receives the offset signal and the sensor which receives the driving signal.

DETAILED DESCRIPTION

Figure 1:
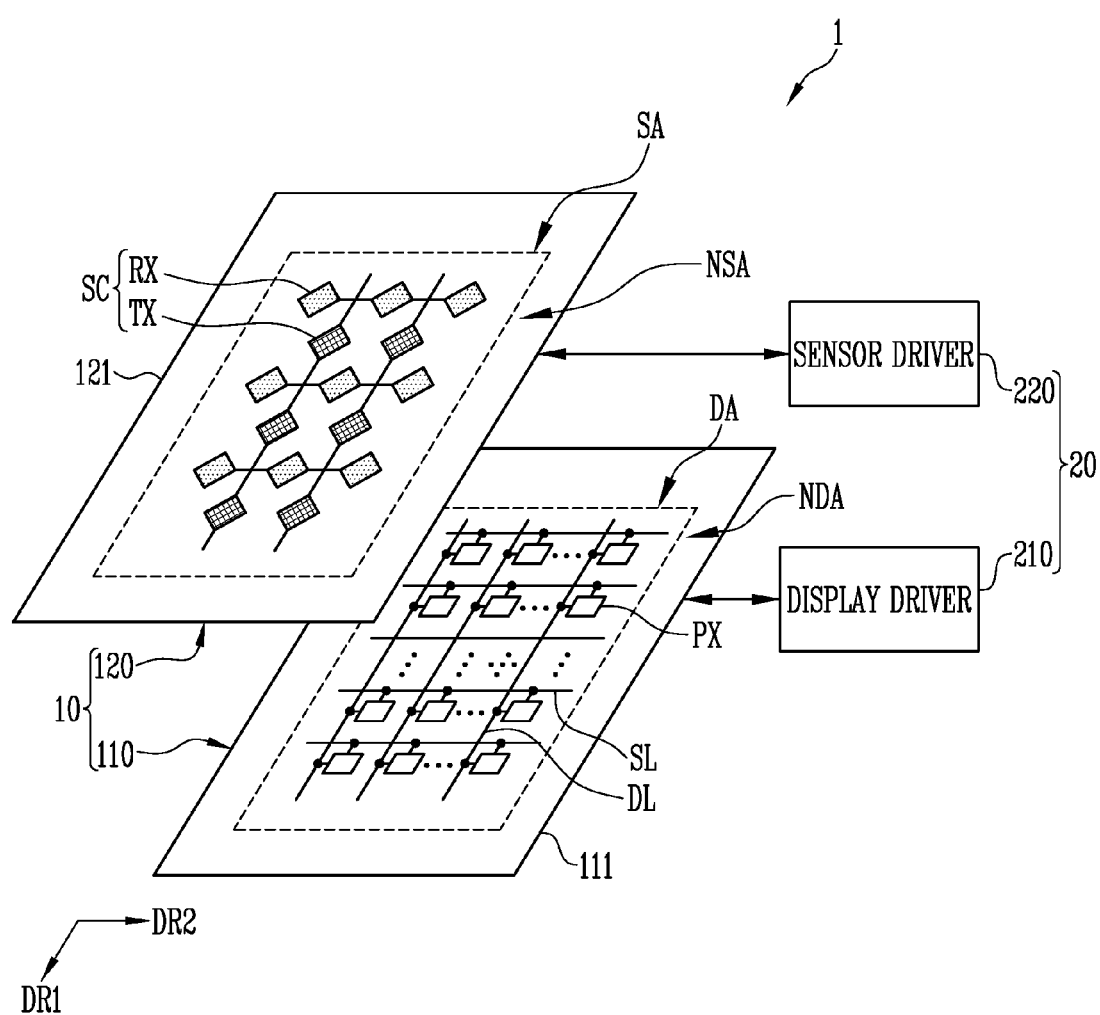
FIG. 1 is a diagram for describing a display device in accordance with an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the drawings, portions which are not related to the disclosure will be omitted to describe the disclosure more clearly. Reference should be made to the drawings, in which similar reference numerals are used throughout the different drawings to designate similar components. Therefore, the aforementioned reference numerals may be used in other drawings.

For reference, the size of each component and the thicknesses of lines illustrating the component are arbitrarily represented for the sake of explanation, and the disclosure is not limited to what is illustrated in the drawings. In the drawings, the thicknesses of the components may be exaggerated to clearly depict multiple layers and areas.

Furthermore, the expression "being the same" may mean "being substantially the same". In other words, the expression "being the same" may include a range that can be tolerated by those skilled in the art. The other expressions may also be expressions from which "substantially" has been omitted.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a diagram for describing a display device 1 in accordance with an embodiment of the disclosure.

Referring to FIG. 1, the display device 1 in accordance with an embodiment of the disclosure may include a panel 10, and a driving circuit component 20 configured to drive the panel 10.

In an embodiment, for example, the panel 10 may include a display component 110 configured to display an image, and a sensor component 120 configured to sense a touch, pressure, a fingerprint, hovering, or the like. In an embodiment, for example, the panel 10 may include pixels PX, and sensors SC that overlap at least some of the pixels PX. In an embodiment, the sensors SC may include first sensors TX and second sensors RX. In an alternative embodiment (e.g., a self-capacitance scheme), the sensors SC may be formed of one type of sensors without being divided into the first sensors or the second sensors. The driving circuit component 20 may include a display driver 210 configured to drive the display component 110, and a sensor driver 220 configured to drive the sensor component 120. In an embodiment, for example, the pixels PX may display an image during each display frame period. In an embodiment, for example, the sensors SC may sense input from a user during each sensing frame period. The sensing frame period and the display frame period may be independent from each other, and be different from each other. The sensing frame period and the display frame period may be synchronized with each other, or may not be synchronized.

In an embodiment, the display component 110 and the sensor component 120 may be separately fabricated, and may then be disposed and/or coupled with each other such that at least portions thereof overlap each other. Alternatively, in an embodiment, the display component 110 and the sensor component 120 may be integrally fabricated. In an embodiment, for example, the sensor component 120 may be directly formed on at least one substrate (e.g., an upper and/or lower substrate of the display panel, or a thin film encapsulation layer) that forms the display component 110, or other insulating layers or various functional layers (e.g., an optical layer or a passivation layer).

Although FIG. 1 illustrates an embodiment where the sensor component 120 is disposed on a front side of the display component 110 (e.g., an upper surface on which an image is displayed), the position of the sensor component 120 is not limited thereto. For example, in an alternative embodiment, the sensor component 120 may be disposed on a rear surface or on opposite surfaces of the display component 110. In an embodiment, the sensor component 120 may be disposed on a peripheral area of at least one side of the display component 110.

The display component 110 may include a display substrate 111 and a plurality of pixels PX disposed on the display substrate 111. The pixels PX may be disposed in a display area DA of the display substrate 111.

The display substrate 111 may include the display area DA to display an image, and a non-display area NDA provided around the periphery of the display area DA. In an embodiment, the display area DA may be disposed in a central portion of the display component 110, and the non-display area NDA may be disposed in a peripheral area of the display component 110 to enclose the display area DA.

The display substrate 111 may be a rigid substrate or a flexible substrate, and the material or properties thereof are not particularly limited. In an embodiment, for example, the display substrate 111 may be a rigid substrate including or made of glass or reinforced glass, or a flexible substrate formed of a thin film including or made of plastic or metal.

Scan lines SL, data lines DL, and pixels PX connected to the scan lines SL and the data lines DL may be disposed in the display area DA. The pixels PX may be selected by scan signals each of which has a turn-on level, and which are supplied from the scan lines SL, may be supplied with data signals from the data lines DL, and may emit light having luminance corresponding to the data signals. Consequently, an image corresponding to the data signals is displayed on the display area DA. In the disclosure, the structure of the pixels PX and a method of driving the pixels PX are not particularly limited. In an embodiment, for example, each of the pixels PX may be implemented as a pixel that can employ various known structures and driving methods.

Various lines and/or an internal circuit component which are connected to the pixels PX of the display area DA may be disposed in the non-display area NDA. In an embodiment, for example, a plurality of lines for supplying various power and control signals to the display area DA may be disposed in the non-display area NDA. In addition, a scan driver and the like may also be disposed in the non-display area NDA.

In the disclosure, the type of the display component 110 is not particularly limited. In an embodiment, for example, the display component 110 may be implemented as a spontaneous-emission-type display panel such as an organic light emitting display panel. However, in an embodiment where the display component 110 is implemented as a spontaneous emission type, each pixel is not limited to the case where the pixel includes only an organic light emitting element. In an embodiment, for example, the light emitting element of each pixel may be formed of an organic light emitting diode, an inorganic light emitting diode, a quantum dot/well light emitting diode, or the like. A plurality of light emitting elements may be provided in each pixel. Here, the plurality of light emitting elements in each pixel may be connected in series, parallel, or series-parallel to each other. Alternatively, the display component 110 may be implemented as a non-emission type display panel such as a liquid crystal display panel. In an embodiment where the display component 110 is implemented as a non-emission type, the display device 1 may further include a light source such as a back-light unit.

The sensor component 120 may include a sensor substrate 121, and a plurality of sensors SC disposed on the sensor substrate 121. The sensors SC may be disposed in a sensing area SA on the sensor substrate 121.

The sensor substrate 121 may include a sensing area SA capable of sensing a touch input or the like, and a peripheral area NSA around the periphery of the sensing area SA. In an embodiment, the sensing area SA may be disposed to overlap at least one area of the display area DA. In an embodiment, for example, the sensing area SA may be set to an area corresponding to the display area DA (e.g., an area overlapping the display area DA). The peripheral area NSA may be set to an area corresponding to the non-display area NDA (e.g., an area overlapping the non-display area NDA). In such an embodiment, when a touch input or the like is provided on the display area DA, the sensor component 120 may detect the touch input.

The sensor substrate 121 may be a rigid or flexible substrate, and may be formed of at least one insulating layer. Furthermore, the sensor substrate 121 may be a transparent or translucent light-transmissive substrate, but the disclosure is not limited thereto. In other words, in the disclosure, the material or properties of the sensor substrate 121 are not particularly limited. In an embodiment, for example, the sensor substrate 121 may be a rigid substrate including or made of glass or reinforced glass, or a flexible substrate formed of a thin film including or made of plastic or metal. Furthermore, in an embodiment, at least one substrate (e.g., a display substrate 111, an encapsulation substrate and/or a thin film encapsulation layer) that forms the display component 110, or at least one insulating layer, functional layer, or the like that is disposed inside and/or outside the display component 110 may be used as the sensor substrate 121.

The sensing area SA may be an area (i.e., an active area of the sensor) capable of responding to touch input. In such an embodiment, the sensors SC for sensing touch input or the like may be disposed in the sensing area SA. In an embodiment, the sensors SC may include first sensors TX and second sensors RX.

In an embodiment, for example, the first sensors TX each may extend in a first direction DR1. The first sensors TX may be arranged to be spaced apart from each other in a second direction DR2. The second direction DR2 may be a direction crossing the first direction DR1. In an embodiment, for example, the second direction DR2 may intersect the first direction DR1. In an embodiment, the extension direction and the arrangement direction of the first sensors TX may correspond to conventional configurations. The first sensors TX each may have a structure in which first cells each having a relatively large surface area and first bridges each having a relatively small surface area are connected to each other. Although FIG. 1 illustrates an embodiment where each of the first cells has a diamond form, the shape of the first cells are not limited thereto. In an embodiment, the first cells may have various typical forms such as a circular form, a rectangular form, a triangular form, and a mesh form. In an embodiment, for example, the first bridges may be integrally formed with the first cells in a same layer as a unitary indivisible part. In an alternative embodiment, the first bridges may be disposed or formed in a layer different from the layer in which the first cells are formed, and may electrically connect the adjacent first cells to each other.

In an embodiment, for example, the second sensors RX each may extend in the second direction DR2. The second sensors RX may be arranged to be spaced apart from each other in the first direction DR1. In an embodiment, the extension direction and the arrangement direction of the second sensors RX may comply with other conventional configurations. The second sensors RX each may have a shape in which second cells each having a relatively large surface area and second bridges each having a relatively small surface area are connected to each other. Although FIG. 1 illustrates an embodiment the second cells each have a diamond form, the shape of the second cells are not limited thereto. In an embodiment, the second cells may have various typical forms such as a circular form, a rectangular form, a triangular form, and a mesh form. In an embodiment, for example, the second bridges may be integrally formed with the second cells in a same layer as a unitary and indivisible part. In an alternative embodiment, the second bridges may be formed in a layer different from a layer in which the second cells are formed, and may electrically connect the adjacent second cells to each other.

In an embodiment, for example, the first cells of the first sensors TX and the second cells of the second sensors RX may be formed or defined by a same conductive layer. Here, the first bridges of the first sensors TX and the second bridges of the second sensors RX may be formed in conductive layers with an insulating layer interposed therebetween. In an embodiment, for example, where the first bridges of the first sensors TX are formed in a same layer as that of the first cells and the second cells, the second bridges of the second sensors RX may be formed in a layer different from that of the first bridges, the first cells, and the second cells, with an insulating layer interposed therebetween. In an embodiment, where the second bridges of the second sensors RX are formed in a same layer as that of the first cells and the second cells, the first bridges of the first sensors TX may be formed in a layer different from that of the second bridges, the first cells, and the second cells, with an insulating layer interposed therebetween.

In an embodiment, the first cells of the first sensors TX and the second cells of the second sensors RX may be formed in different conductive layers with an insulating layer interposed therebetween. Here, the first cells and the first bridges of the first sensors TX may be formed in a same conductive layer as each other. Furthermore, the second cells and the second bridges of the second sensors RX may be formed in a same conductive layer as each other.

In an embodiment, the first sensors TX and the second sensors RX each may include at least one selected from metal, a transparent conductive material, and various other conductive materials, and thus have electrical conductivity. In an embodiment, for example, the first sensor TX and the second sensors RX may include at least one selected from various metals including gold (Au), silver (Ag), aluminum (Al), molybdenum (Mo), chrome (Cr), titanium (Ti), nickel (Ni), neodymium (Nd), copper (Cu), platinum (Pt), and the like, or an alloy thereof. Here, the first sensors TX and the second sensors RX may have a mesh form. Furthermore, the first sensor TX and the second sensors RX may include at least one selected from various transparent conductive materials including silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nanotubes, and graphene. In addition, the first sensor TX and the second sensors RX may include at least one selected from various conductive materials, and may thus be electrically conductive. Furthermore, the first sensors TX and the second sensors RX each may be formed of or defined by a single layer or multiple layers, and a cross-sectional structure thereof is not particularly limited.

In the peripheral area NSA of the sensor component 120, sensor lines may be disposed to electrically connect the sensors TX and RX with the sensor driver 220 or the like.

The driving circuit component 20 may include the display driver 210 configured to drive the display component 110, and the sensor driver 220 configured to drive the sensor component 120. In an embodiment, the display driver 210 and the sensor driver 220 may be formed of or defined by separate integrated chips (ICs). In an embodiment, the display driver 210 and the sensor driver 220 may be at least partially integrated into a single or same IC.

The display driver 210 may be electrically connected to the display component 110 and configured to drive the pixels PX. In an embodiment, for example, the display driver 210 may include a data driver and a timing controller. The scan driver may be separately mounted in the non-display area NDA of the display component 110. In an embodiment, the display driver 210 may include all of or at least selected from the data driver, the timing controller, and the scan driver.

The sensor driver 220 may be electrically connected to the sensor component 120 and configured to drive the sensor component 120. The sensor driver 220 may include a sensor transmitter and a sensor receiver. In an embodiment, the sensor transmitter and the sensor receiver may be integrated into a single IC, but the disclosure is not limited thereto.

Figure 2:
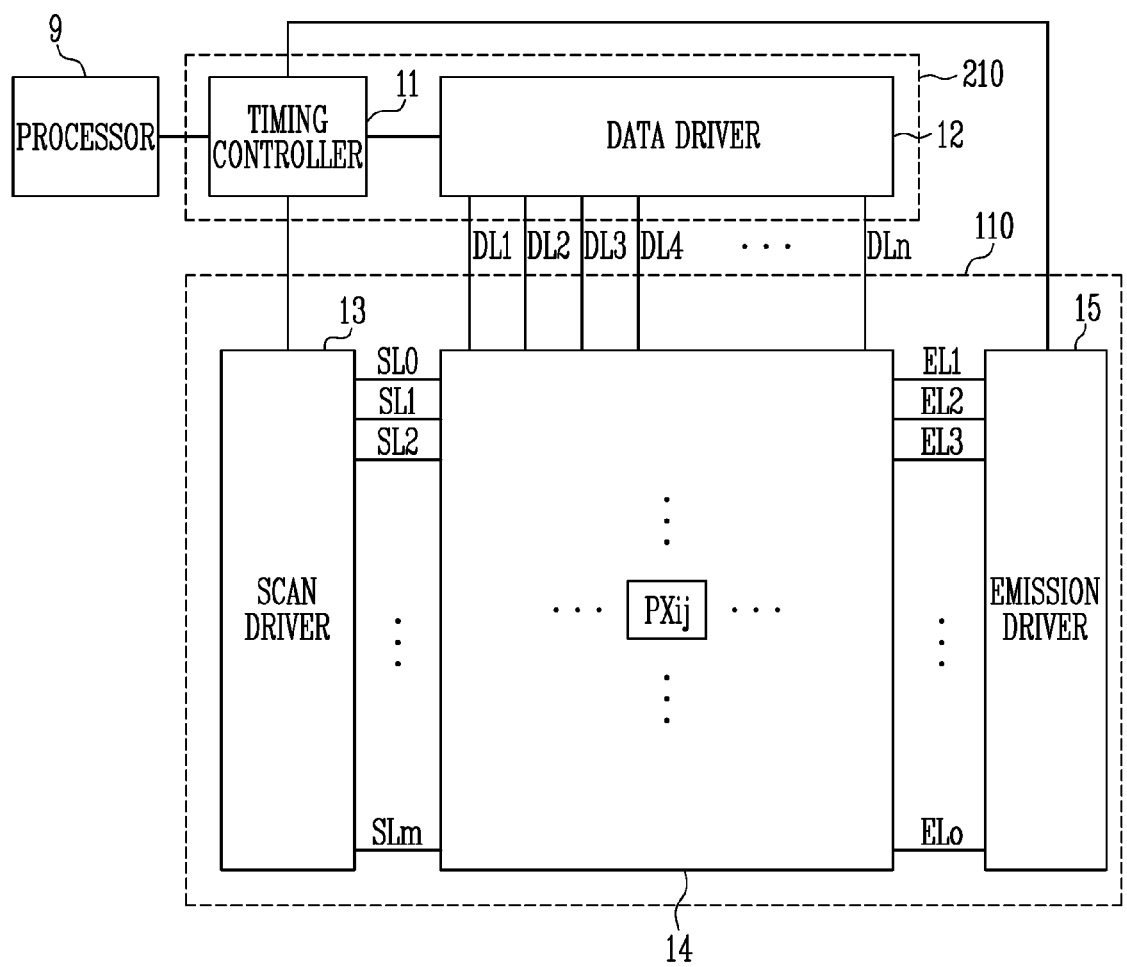
FIGS. 2 to 4 are diagrams for describing a display component and a display driver in accordance with an embodiment of the disclosure.
Figure 3:
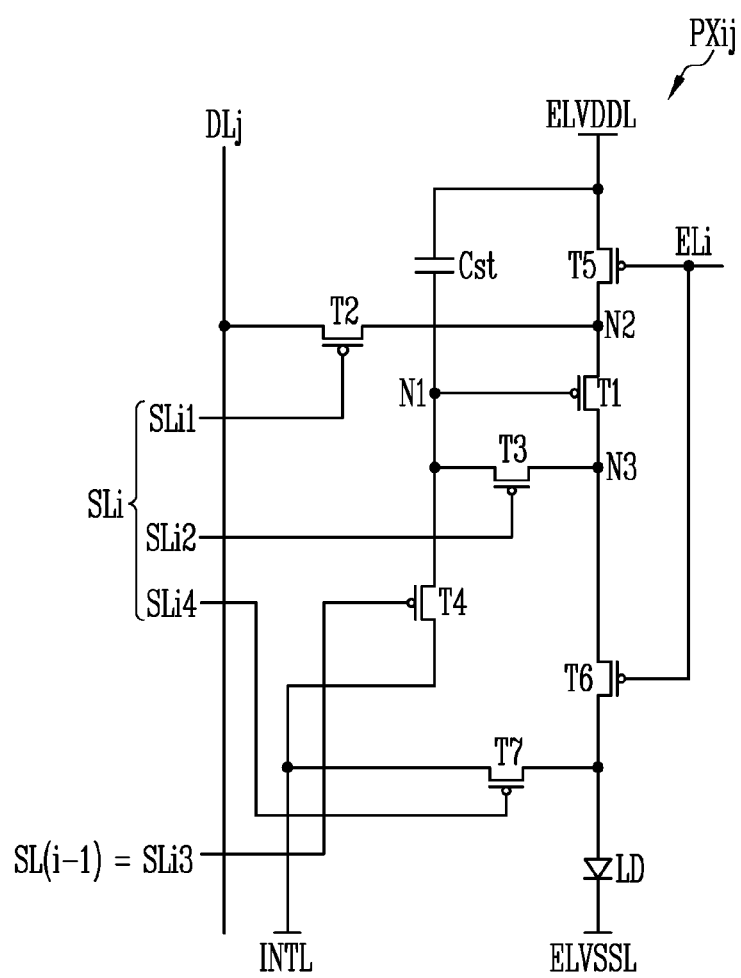
Figure 4:
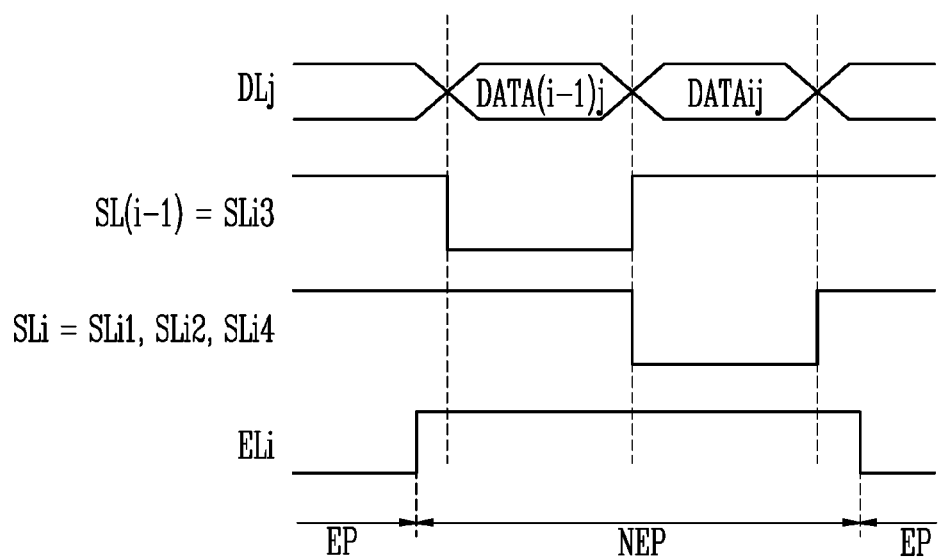

FIGS. 2 to 4 are diagrams for describing the display component 110 and the display driver 210 in accordance with an embodiment of the disclosure.

Referring to FIG. 2, the display driver 210 may include a timing controller 11 and a data driver 12. The display component 110 may include a scan driver 13, a pixel component 14, and an emission driver 15. In an embodiment, as described above, the configuration of the foregoing function components pertaining to, for example, whether to integrate the foregoing function components on one IC or a plurality of ICs or whether to mount the function components on a display substrate 111, may be changed in various ways depending on specifications of the display device 1.

The timing controller 11 may receive grayscale signals and timing signals for each frame period from a processor 9. Here, the processor may correspond to at least one selected from a graphics processing unit (GPU), a central processing unit (CPU), an application processor (AP), and the like. The timing signals may include a vertical synchronization signal, a horizontal synchronization signal, a data enable signal, or the like.

Each cycle of the vertical synchronization signal may correspond to a corresponding frame period. Each cycle of the horizontal synchronization signal may correspond to a corresponding horizontal period. The grayscale signals may be supplied on a horizontal line-by-horizontal line basis in response to a pulse of an enable level of a data enable signal during each horizontal period. The horizontal line may refer to pixels (e.g., a pixel line) connected to a same scan line and a same emission line.

The timing controller 11 may render the grayscale signals in consideration of the specifications of the display device 1. In an embodiment, for example, the processor 9 may provide a red grayscale signal, a green grayscale signal, and a blue grayscale signal for each unit dot. In an embodiment, for example, where the pixel component 14 has an RGB stripe structure, pixels may correspond one-to-one to respective grayscale signals. In such an embodiment, rendering of the grayscale signals may be omitted. In an embodiment where the pixel component 14 has a PENTILE™ structure, because adjacent unit dots may share a pixel, the pixels may not correspond one-to-one to the respective grayscale signals. In such an embodiment, the rendering of the grayscale signals may be performed. Grayscale signals that have been rendered or have not been rendered may be provided to the data driver 12. Furthermore, the timing controller 11 may provide a data control signal to the data driver 12. In addition, the timing controller 11 may provide a scan control signal to the scan driver 13, and may provide an emission control signal to the emission driver 15.

The data driver 12 may generate, using the grayscale signals and the data control signal that are received from the timing controller 11, data voltages (i.e., data signals) to be provided to data lines DL1, DL2, DL3, . . . , and DLn. Here, n is an integer greater than 0.

The scan driver 13 may generate, using scan control signals (e.g., a clock signal, a scan start signal, and the like) received from the timing controller 11, scan signals to be provided to the scan lines SL0, SL1, SL2, . . . , SLm. The scan driver 13 may sequentially supply scan signals each having a turn-on level pulse to the scan lines SL0 to SLm.

The scan driver 13 may include scan stages configured in the form of a shift register. The scan driver 13 may generate scan signals in such a way to sequentially transmit a scan start signal having a turn-on level pulse to a subsequent scan stage under the control of a clock signal. Here, m is an integer greater than 0.

The emission driver 15 may generate, using emission control signals (e.g., a clock signal, an emission stop signal, and the like) received from the timing controller 11, emission signals to be provided to the emission lines EL1, EL2, EL3, . . . , and ELo. The emission driver 15 may sequentially supply emission signals, each having a turn-on level pulse, to the emission lines EL1 to ELo. The emission driver 15 may include emission stages, each of which is configured in the form of a shift register. The emission driver 15 may generate emission signals in such a way to sequentially transmit an emission stop signal having a turn-off level pulse to a subsequent emission stage under the control of a clock signal. Here, o is an integer greater than 0.

The pixel component 14 includes pixels. Each pixel PXij may be connected to a corresponding data line among the data lines DL1, DL2, DL3, . . . , and DLn, a corresponding scan line among the scan lines SL0, SL1, SL2, . . . , SLm, and an emission line among the emission lines EL1 to ELo. The pixels may include pixels configured to emit a first color of light, pixels configured to emit a second color of light, and pixels configured to emit a third color of light. The first color, the second color, and the third color may be different colors from each other. the emission lines EL1 to ELo example, the first color may be one of red, green, and blue. The second color may be another of red, green, and blue, other than the first color. The third color may be the other color among the red, green, and blue. Alternatively, magenta, cyan, and yellow may be used as the first to third colors.

FIG. 3 is a diagram illustrating a pixel PXij in accordance with an embodiment of the disclosure.

Referring to FIG. 3, the pixel PXij may include transistors T1, T2, T3, T4, T5, T6, and T7, a storage capacitor Cst, and a light emitting element LD.

Hereinafter, a circuit configured of P-type transistors will be described by way of example. However, those skilled in the art may design a circuit configured of N-type transistors by changing the polarity of the voltage to be applied to a gate terminal of each transistor. Likewise, those skilled in this art may design a circuit configured of a combination of a P-type transistor and an N-type transistor. The term "P-type transistor" is a general name for transistors in which the amount of current increases when a voltage difference between a gate electrode and a source electrode increases in a negative direction. The term "N-type transistor" is a general name for transistors in which the amount of current increases when a voltage difference between a gate electrode and a source electrode increases in a positive direction. Each transistor may be configured in various forms such as a thin film transistor (TFT), a field effect transistor (FET), and a bipolar junction transistor (BJT).

The first transistor T1 may include a gate electrode connected to a first node N1, a first electrode connected to a second node N2, and a second electrode connected to a third node N3. The first transistor T1 may be referred to as a driving transistor.

The second transistor T2 may include a gate electrode connected to a scan line SLi1, a first electrode connected to a data line DLj, and a second electrode connected to the second node N2. The second transistor T2 may be referred to as a scan transistor.

The third transistor T3 may include a gate electrode connected to a scan line SLi2, a first electrode connected to the first node N1, and a second electrode connected to the third node N3. The third transistor T3 may be referred to as a diode connection transistor.

The fourth transistor T4 may include a gate electrode connected to a scan line SLi3, a first electrode connected to the first node N1, and a second electrode connected to an initialization line INTL. The fourth transistor T4 may be referred to as a gate initialization transistor.

The fifth transistor T5 may include a gate electrode connected to an i-th emission line ELi, a first electrode connected to a first power line ELVDDL, and a second electrode connected to the node N2. The fifth transistor T5 may be referred to as an emission transistor. In an alternative embodiment, the gate electrode of the fifth transistor T5 may be connected to an emission line different from the emission line to which a gate electrode of the sixth transistor T6 is connected.

The sixth transistor T6 may include the gate electrode connected to the i-th emission line ELi, a first electrode connected to the third node N3, and a second electrode connected to an anode of the light emitting element LD. The sixth transistor T6 may be referred to as an emission transistor. In an alternative embodiment, the gate electrode of the sixth transistor T6 may be connected to an emission line different from the emission line to which a gate electrode of the fifth transistor T5 is connected.

The seventh transistor T7 may include a gate electrode connected to a scan line SLi4, a first electrode connected to the initialization line INTL, and a second electrode connected to the anode of the light emitting element LD. The seventh transistor T7 may be referred to as a light-emitting-element initialization transistor.

The storage capacitor Cst may include a first electrode connected to the first power line ELVDDL, and a second electrode connected to the first node N1.

The light emitting element LD may include the anode connected to the second electrode of the sixth transistor T6, and a cathode connected to a second power line ELVSSL. The light emitting element LD may be a light emitting diode. The light emitting element LD may be formed of or defined by an organic light emitting diode, an inorganic light emitting diode, a quantum dot/well light emitting diode, or the like. The light emitting element LD may emit light having one of a first color, a second color, and a third color. Although in an embodiment only a single light emitting element LD may be provided in each pixel, a plurality of light emitting elements may be provided in each pixel in an alternative embodiment. In such an embodiment, the plurality of light emitting elements may be connected in series, parallel, or series-parallel to each other.

A first power voltage may be applied to the first power line ELVDDL. A second power voltage may be applied to the second power line ELVSSL. An initialization voltage may be applied to the initialization line INTL. In an embodiment, for example, the first power voltage may be greater than the second power voltage. In an embodiment, for example, the initialization voltage may be the same as or greater than the second power voltage. In an embodiment, for example, the initialization voltage may correspond to the lowest data voltage among data voltages that can be provided. In an alternative embodiment, the magnitude of the initialization voltage may be less than the magnitudes of the data voltages that can be provided.

FIG. 4 is a diagram for describing an example of a method of driving the pixel of FIG. 3.

Hereinafter, for convenience of description, an embodiment where each of the scan lines SLi1, SLi2, and SLi4 is an i-th scan line SLi, and that the scan line SLi3 is an (i−1)-th scan line SL(i−1) will be described. Here, connection relationships between the scan lines SLi1, SLi2, SLi3, and SLi4 may be changed in various ways depending on the embodiments. In an embodiment, for example, the scan line SLi4 may be an (i−1)-th scan line or an (i+1)-th scan line.

In an embodiment, as shown in FIG. 4, an emission signal having a turn-off level (a logic high level) may be applied to the i-th emission line Eli. A data voltage DATA(i−1)j for an (i−1)-th pixel may be applied to the data line DLj. A scan signal having a turn-on level (a logic low level) may be applied to the scan line SLi3. Whether the logic level is high or low may be changed or determined depending on whether the transistor is a P-type or an N-type.

Here, because a scan signal having a turn-off level is applied to the scan lines SLi1 and SLi2, the second transistor T2 is turned off, so that the data voltage DATA(i−1)j for the (i−1)-th pixel may be prevented from being drawn into the pixel PXij.

Here, because the fourth transistor T4 is turned on, the first node N1 is connected to the initialization line INTL, and the voltage of the first node N1 is initialized. Because an emission signal having a turn-off level is applied to the emission line Eli, the transistors T5 and T6 are turned off, and the light emitting element LD may be prevented from being undesirably operated during an initialization voltage application process.

Next, a data voltage DATAij for the i-th pixel PXij is applied to the data line DLj, and a scan signal having a turn-on level is applied to the scan lines SLi1 and SLi2. Hence, the transistors T2, T1, and T3 enter a state capable of conducting electricity, and the data line DLj and the first node N1 are electrically connected to each other. Therefore, a compensation voltage obtained by subtracting a threshold voltage of the first transistor T1 from the data voltage DATAij is applied to the second electrode (i.e., the first node N1) of the storage capacitor Cst. The storage capacitor Cst may maintain a voltage corresponding to the difference between the first power voltage and the compensation voltage. This period may be referred to as a threshold voltage compensation period or a data write period.

Furthermore, in an embodiment where the scan line SLi4 is an i-th scan line, the seventh transistor T7 is turned on, so that the anode of the light emitting element LD and the initialization line INTL may be connected to each other, and the light emitting element LD may be initialized to the amount of charges corresponding to the difference between the initialization voltage and the second power voltage.

Thereafter, as an emission signal having a turn-on level is applied to the i-th emission line Eli, the transistors T5 and T6 may conduct electricity or electrical current. Therefore, a driving current path that connects the first power line ELVDDL, the fifth transistor T5, the first transistor T1, the sixth transistor T6, the light emitting element LD, and the second power line ELVSSL may be formed.

The amount of driving current that flows through the first electrode and the second electrode of the first transistor T1 may be adjusted in response to the voltage maintained in the storage capacitor Cst. The light emitting element LD may emit light at a luminance corresponding to the amount of driving current. The light emitting element LD may emit light until an emission signal having a turn-off level is applied to the emission line ELi.

When the emission signal is at a turn-on level, pixels that receive the corresponding emission signal may be in a display state. Therefore, the period during which the emission signal is at a turn-on level may be referred to as an emission period EP (or an emission enable period). Furthermore, when the emission signal is at a turn-off level, pixels that receive the corresponding emission signal may be in a non-display state. Therefore, the period during which the emission signal is at a turn-off level may be referred to as a non-emission period NEP (or an emission inhibit period).

The non-emission period NEP described with reference to FIG. 4 may be for preventing the pixel PXij from emitting light at an undesired luminance during the initialization period and the data write period.

In an embodiment, while data written in the pixel PXij is maintained (e.g., during one frame period), one or more non-emission periods NEP may be added. In such an embodiment, as the emission period EP is reduced, low gray scales may be effectively expressed, or motion in an image may be smoothly blur-processed.

Figure 5:
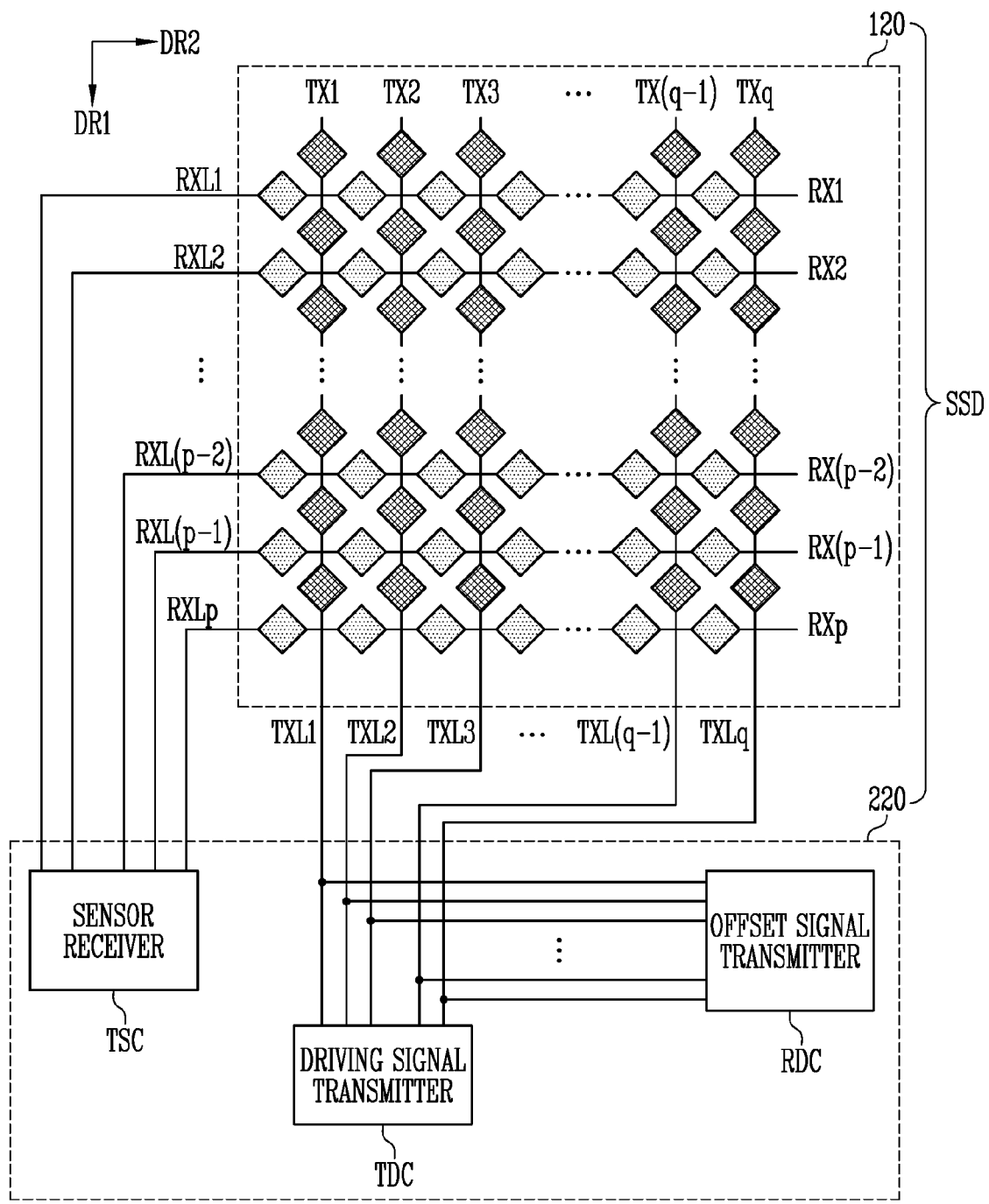
FIG. 5 is a diagram illustrating a sensor device in accordance with an embodiment of the disclosure.

FIG. 5 is a diagram illustrating a sensor device SSD in accordance with an embodiment of the disclosure.

Referring to FIG. 5, the sensor device SSD in accordance with an embodiment of the disclosure may include a sensor component 120 and a sensor driver 220. The sensor device SSD may be included in the display device 1.

The sensor component 120 may include first sensors TX1, TX2, TX3, . . . , TX(q−1), and TXq, and second sensors RX1, RX2, . . . , RX(p−2), RX(p−1), and RXp. Here, p and q each may be an integer greater than 0. The first sensors TX1 to TXq may extend in the first direction DR1 and may be arranged to be spaced apart from each other in the second direction DR2. The second sensors RX1 to RXp may extend in the second direction DR2 and be arranged to be spaced apart from each other in the first direction DR1. The second sensors RX1 to RXp may intersect the first sensors TX1 to TXq. The second sensors RX1 to RXp and the first sensors TX1 to TXq may form mutual capacitance therebetween. The sensor driver 220 may sense changes in the capacitances, and determine whether a user touch has been input.

The sensor driver 220 may include a sensor receiver TSC, a driving signal transmitter TDC, and an offset signal transmitter RDC. The driving signal transmitter TDC may be connected to the first sensors TX1 to TXq, and may supply driving signals to the first sensors TX1 to TXq. The driving signal transmitter TDC may be connected to the first sensors TX1 to TXq by first sensor lines TXL1, TXL2, TXL3, . . . , TXL(q−1), and TXLq.

The sensor receiver TSC may be connected to the second sensors RX1 to RXp and may receive sensing signals from the second sensors RX1 to RXp. The sensor receiver TSC may be connected to the second sensors RX1 to RXp by second sensor lines RXL1, RXL2, . . . , RXL(p−2), RXL(p−1), and RXLp.

The offset signal transmitter RDC may be connected to the first sensors TX1 to TXq, and may supply offset signals to the first sensors TX1 to TXq. The offset signal transmitter RDC may be connected to the first sensors TX1 to TXq by the first sensor lines TXL1 to TXLq.

Figure 6:
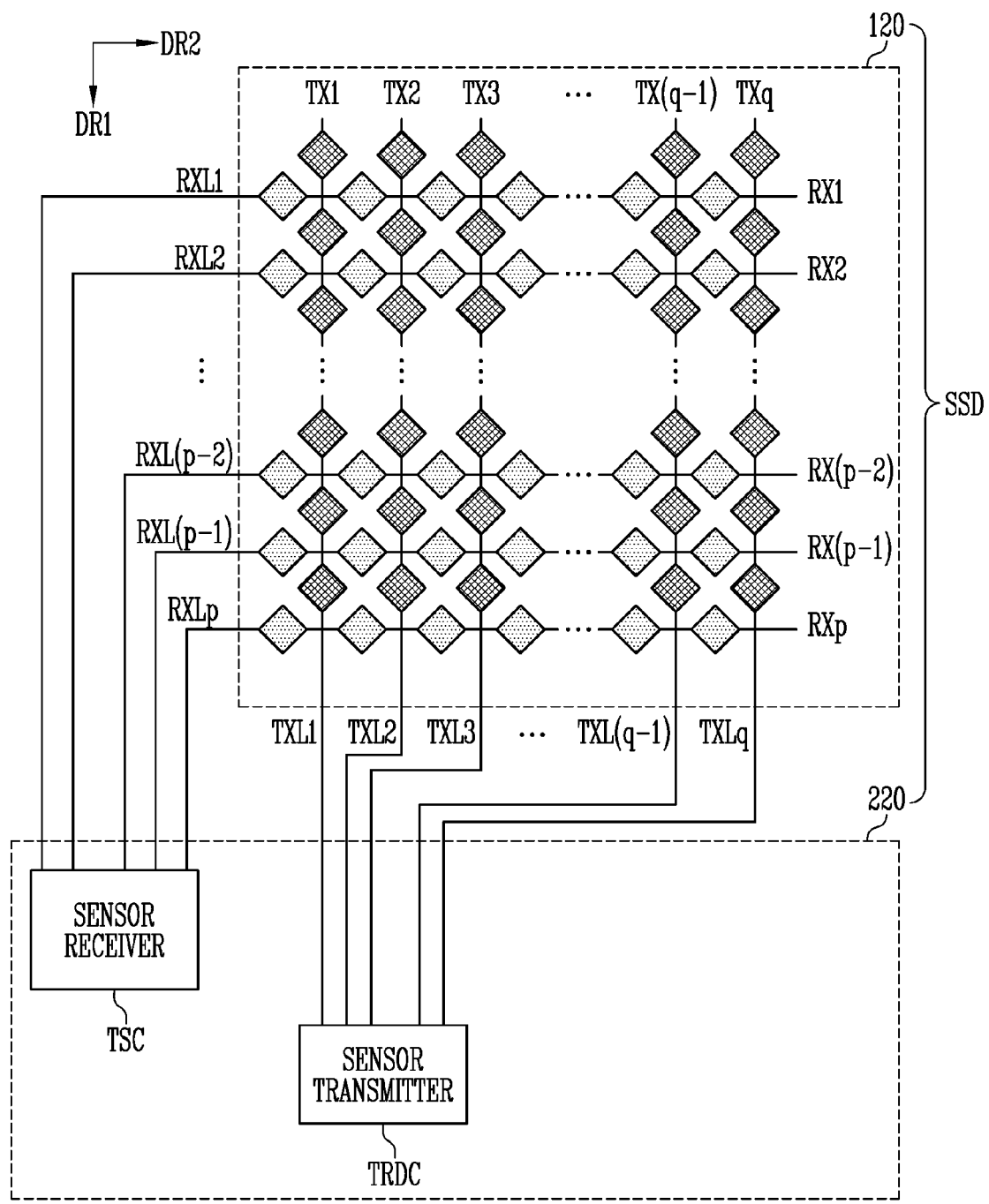
FIG. 6 is a diagram for describing a sensor device in accordance with an embodiment of the disclosure.

FIG. 6 is a diagram for describing a sensor device in accordance with an embodiment of the disclosure.

Referring to FIG. 6, the sensor driver 220 may include a sensor receiver TSC and a sensor transmitter TRDC. The sensor transmitter TRDC may supply driving signals or offset signals to the first sensors TX1 to TXq. In an embodiment, for example, the sensor transmitter TRDC may have a same structure as that of the offset signal transmitter RDC of FIG. 5.

Figure 7:
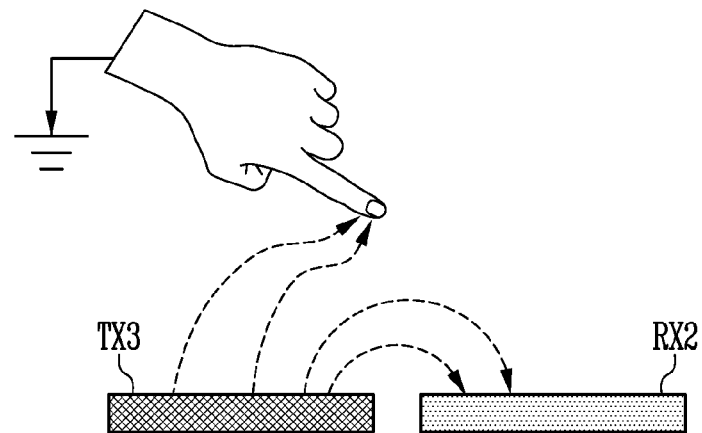
FIG. 7 is a diagram for describing a method of driving the sensor device of FIG. 5 or 6.
Figure 7:
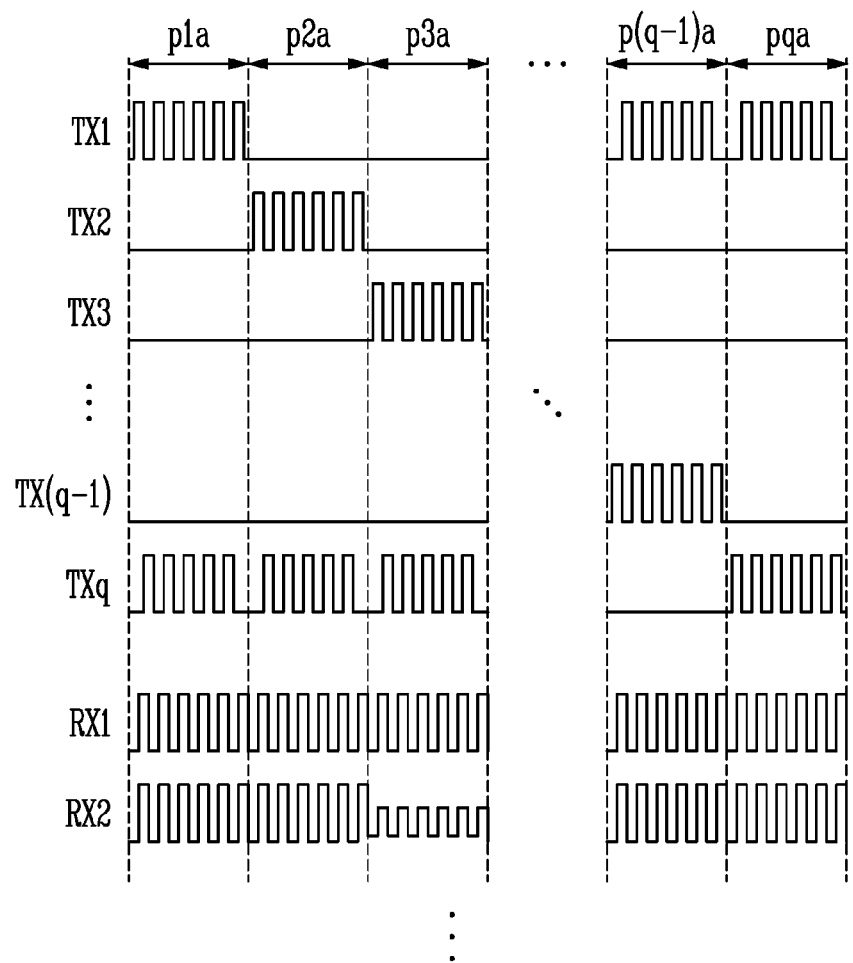

FIG. 7 is a diagram for describing a method of driving the sensor device of FIG. 5 or 6.

In an embodiment, the sensor driver 220 may transmit driving signals to the first sensors TX1 to TXq through the first sensor lines TXL1 to TXLq, and may receive sensing signals from the second sensors RX1 to RXp through the second sensor lines RXL1 to RXLp.

In an embodiment, for example, driving signals that alternate between a high level and a low level may be sequentially applied to the first sensors TX1 to TXq. During a period p1a, the sensor driver 220 may apply, to the first sensor TX1, a driving signal that alternates between a high level and a low level, and may not apply a driving signal to the other first sensors TX2 to TXq. Thereafter, during a period p2a, the sensor driver 220 may apply, to the first sensor TX2, a driving signal that alternates between a high level and a low level, and may not apply a driving signal to the other first sensors TX1, and TX3 to TXq. Next, during a period p3a, the sensor driver 220 may apply, to the first sensor TX3, a driving signal that alternates between a high level and a low level, and may not apply a driving signal to the other first sensors TX1, TX2, . . . , TX(q−1), and TXq. Subsequently, during a period p(q−1)a, the sensor driver 220 may apply, to the first sensor TX(q−1), a driving signal that alternates between a high level and a low level, and may not apply a driving signal to the other first sensors TX1 to TX3, . . . , and TXq. Thereafter, during a period pqa, the sensor driver 220 may apply, to the first sensor TXq, a driving signal that alternates between a high level and a low level, and may not apply a driving signal to the other first sensors TX1 to TX(q−1).

FIG. 7 shows a case where the user touches an intersection between the first sensor TX3 and the second sensor RX2 with a finger. In this case, capacitance between the first sensor TX3 and the second sensor RX2 may be reduced, so that the magnitude of a sensing signal received from the second sensor RX2 during the period p3a for applying a driving signal to the first sensor TX3 may be reduced. Therefore, the sensor driver 220 may determine a portion of the display device 1 that has been touched by the user.

The sensor driver 220 may sequentially transmit driving signals to the first sensors TX1 to TXq, and transmit, during each of the periods in which the driving signals are transmitted, an offset signal that is identical in frequency to and different in phase from the driving signals to at least one of the first sensors TX1 to TXq that do not receive the driving signals. In an embodiment, for example, the driving signal and the offset signal may differ in phase from each other by 180°.

In an embodiment, for example, offset signals that alternate between a high level and a low level may be selectively applied to the first sensors TX1 to TXq. During the period p1a, the sensor driver 220 may apply, to the first sensor TXq, an offset signal that alternates between a high level and a low level. In an embodiment, when the driving signal increases from the low level to the high level in the first sensor TX1, the offset signal may decrease from the high level to the low level in the first sensor TXq. In such an embodiment, when the driving signal decreases from the high level to the low level in the first sensor TX1, the offset signal may increase from the low level to the high level in the first sensor TXq. Therefore, electromagnetic interference (EMI), which may occur in the driving signal of the first sensor TXq, can be offset by the offset signal of the first sensor TXq.

In such an embodiment, during the periods p2a and p3a, the sensor driver 220 may apply, to the first sensor TXq, an offset signal that alternates between a high level and a low level. During the periods p(q−1)a and pqa, the sensor driver 220 may apply, to the first sensor TX1, an offset signal that alternates between a high level and a low level. In such an embodiment, among the first sensors TX1 to TXq, the first sensor to which an offset signal is transmitted may be a sensor that is farthest from the first sensor to which a driving signal is transmitted, such that a reduction in touch sensitivity may be minimized. In an embodiment, the first sensor to which the offset signal is transmitted may be the 1st first sensor TX1 or the last first sensor TXq among the first sensors.

The sensor driver 220 may set at least one selected from the slew rate and the voltage level of the offset signal to a value different from that of a corresponding driving signal. Here, the corresponding driving signal is a driving signal applied at the same timing as the offset signal. The slew rate may refer to a voltage change rate per unit time. In an embodiment, for example, lengths of the first sensor lines TXL1 to TXLq may differ from each other. As the length of the first sensor line (i.e., the distance between the sensor driver 220 and the sensor) is increased, a load or a resistive-capacitive (RC) delay may be increased, so that the slew rate may decrease. In a case where the first sensor line TXLq among the first sensor lines TXL1 to TXLq is longest, even if the sensor driver 220 applies driving signals having a same slew rate and a same voltage level to the first sensor lines TXL1 to TXLq, a driving signal that is applied to the first sensor TXq may have the lowest slew rate and the lowest voltage level, compared to those of driving signals that are applied to other first sensors TX1 to TX(q−1). Therefore, in the case where the off signal is generated to have a constant slew rate and a constant voltage level, a reverse wavelength of the off signal may not match the driving signal. Thus, the EMI may not be completely offset, whereby the effect may be reduced. Therefore, it is desired for the sensor driver 220 to generate offset signals based on or considering the lengths of the first sensor lines TXL1 to TXLq.

Figure 8:
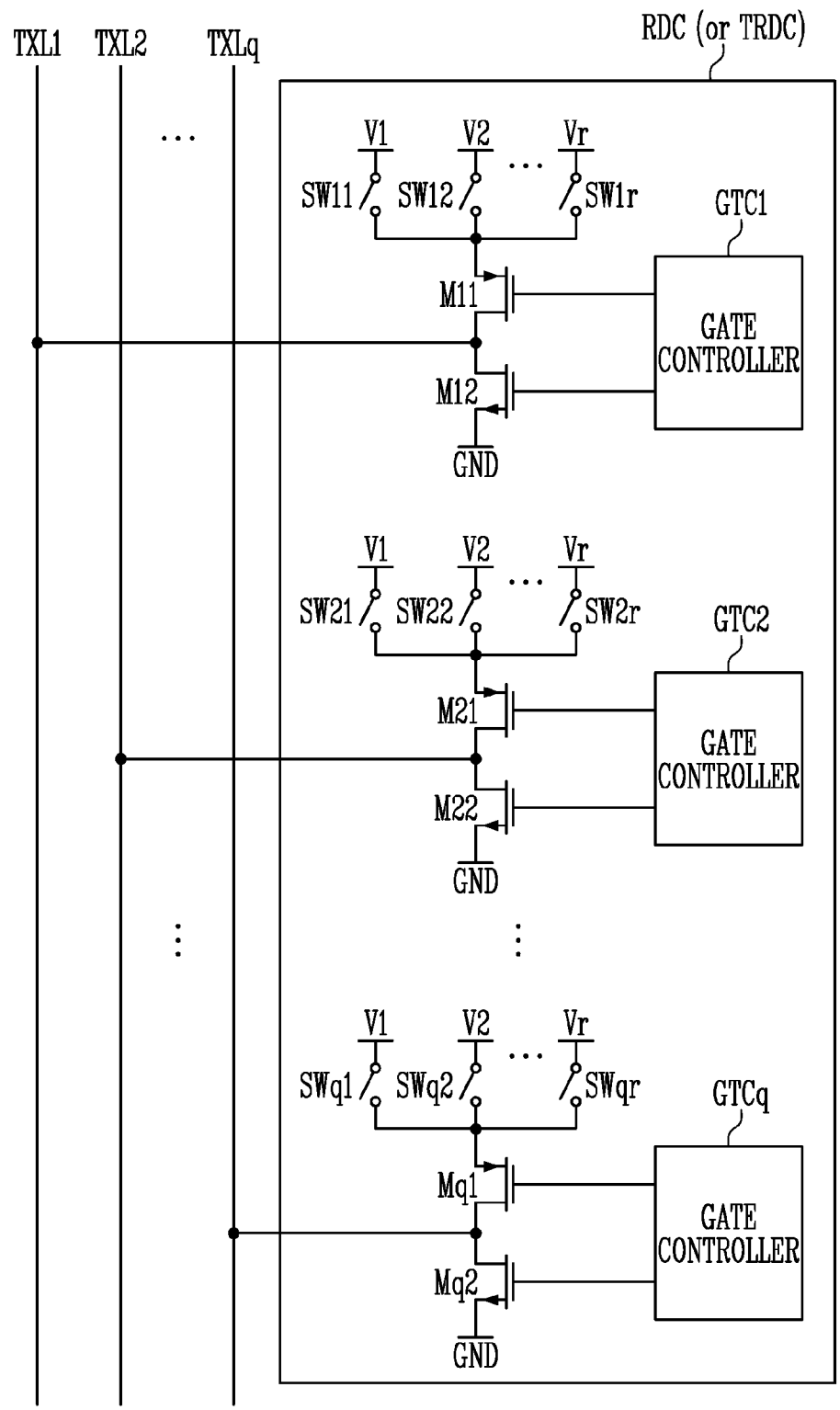
FIGS. 8 to 10 are diagrams for describing a sensor driver in accordance with an embodiment of the disclosure.
Figure 9:
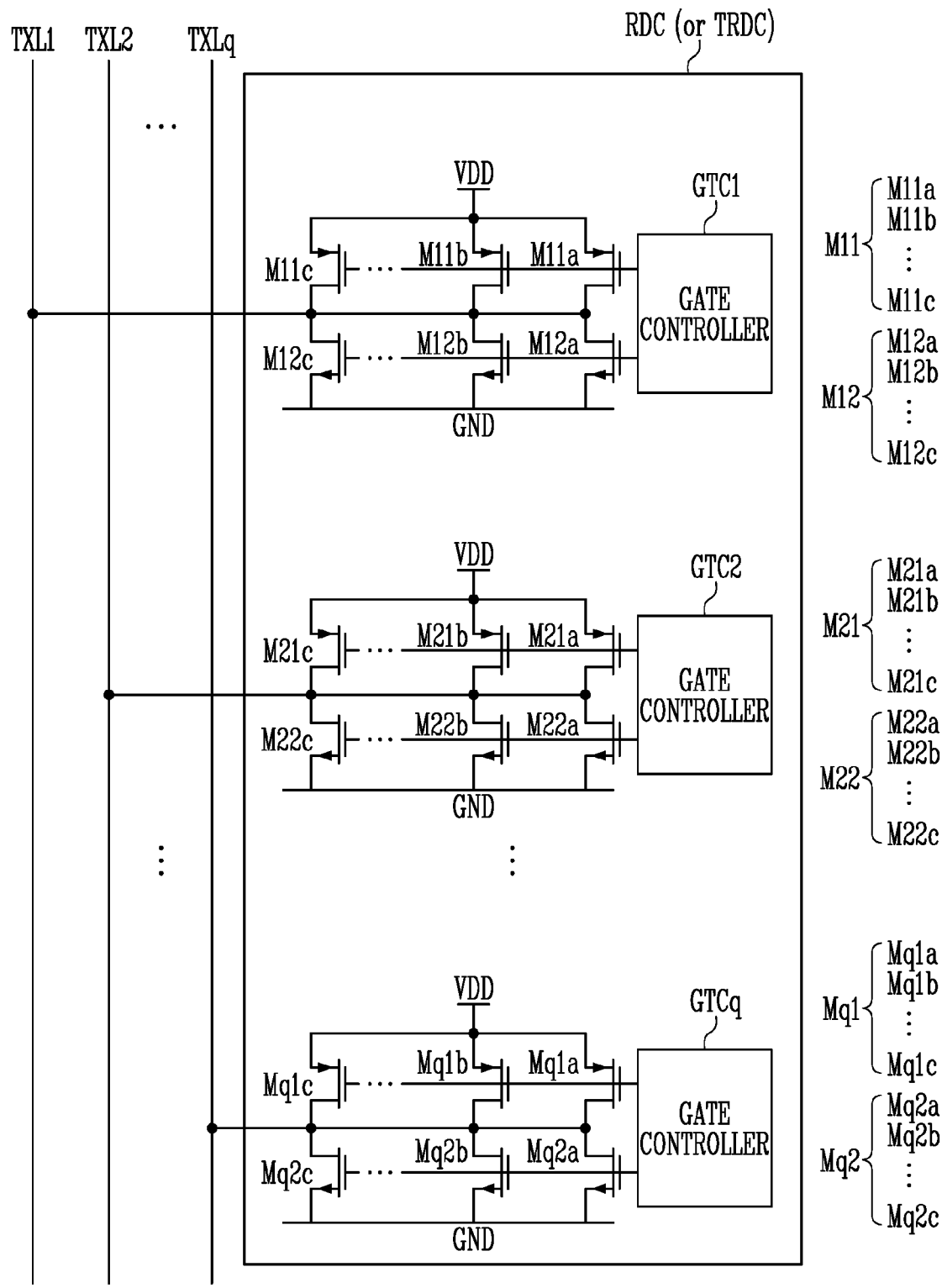
Figure 10:
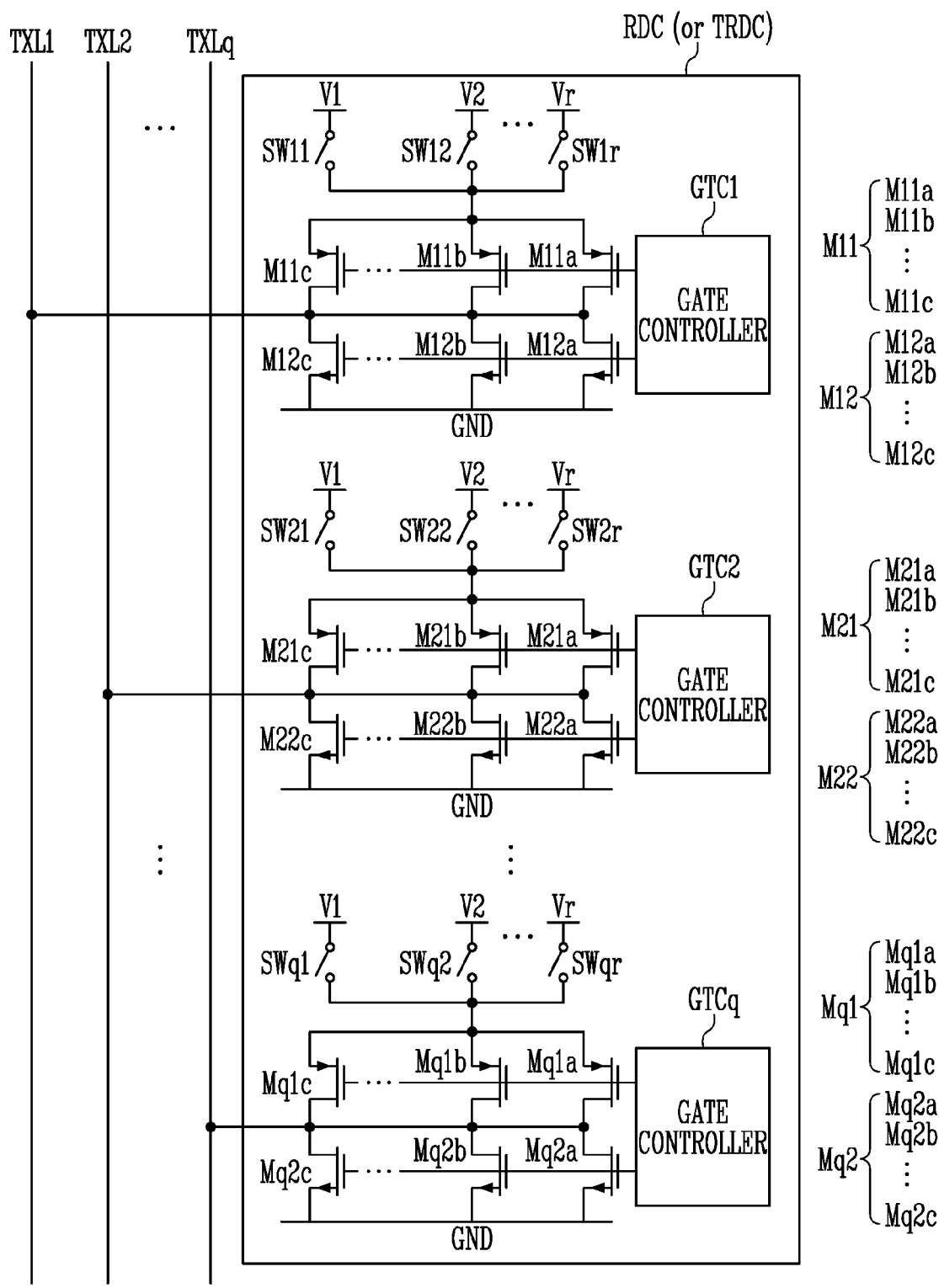

FIGS. 8 to 10 are diagrams for describing a sensor driver in accordance with an embodiment of the disclosure.

FIG. 8 illustrates an embodiment of an offset signal transmitter RDC or a sensor transmitter TRDC. In an embodiment, in each of the periods p1a to pqa, the offset signal transmitter RDC may transmit an offset signal that alternates between a reference voltage GND and one of the driving voltages V1 V2, . . . , and Vr. Here, r is an integer greater than 1.

In an alternative embodiment, in each of the periods p1a to pqa, the sensor transmitter TRDC may transmit an offset signal that alternates between the reference voltage GND and one of the driving voltages V1 V2, . . . , and Vr. In such an embodiment, in each of the periods p1a to pqa, the sensor transmitter TRDC may transmit a driving signal that alternates between the reference voltage GND and one of the driving voltages V1 V2, . . . , and Vr.

In a case where a first sensor line through which an offset signal is transmitted is longer than a first sensor line through which a driving signal is transmitted, the sensor driver 220 may set the voltage level of the offset signal to a value greater than the voltage level of the driving signal. In an embodiment, for example, the driving voltage Vr may be greater than the driving voltage V2, the driving voltage V2 may be greater than the driving voltage V1, and the driving voltage V1 may be greater than the reference voltage GND. In such an embodiment, during the period pia, the sensor driver 220 transmits a driving signal that alternates between the driving voltage V1 and the reference voltage GND to the first sensor line TXL1. Here, the sensor driver 220 may transmit an offset signal that alternates between the driving voltage Vr and the reference voltage GND to the first sensor line TXLq. Therefore, the voltage level of the driving signal to be applied to the first sensor TX1 and the voltage level of the driving signal to be applied to the first sensor TXq may match with each other, so that the EMI can be effectively offset.

Referring to FIG. 8, for each of the first sensor lines TXL1 to TXLq, the sensor driver 220 may include a plurality of switches, a plurality of transistors, and a gate controller. That is, the sensor driver 220 may include a plurality of units (or unit circuits) connected to the first sensor lines TXL1 to TXLq, respectively, and each of the units may include a plurality of switches, a plurality of transistors, and a gate controller. In an embodiment, for example, for the first sensor line TXL1, the sensor driver 220 may include a plurality of switches SW11, SW12, . . . , and SW1r, a plurality of transistors M11 and M12, and a gate controller GTC1.

The plurality of switches SW11, SW12, . . . , and SW1r may receive different driving voltages V1, V2, . . . , and Vr, respectively. The first transistor M11 may include a first electrode connected to the plurality of switches SW11, SW12, . . . , and SW1r, a second electrode connected to a first electrode of the second transistor M12, and a gate electrode connected to the gate controller GTC1. The second transistor M12 may include the first electrode connected to the second electrode of the first transistor M11, a second electrode configured to receive the reference voltage GND, and a gate electrode connected to the gate controller GTC1. The second electrode of the first transistor M11 and the first electrode of the second transistor M12 may be connected to the first sensor line TXL1. The gate controller GTC1 may alternately turn on the first transistor M11 and the second transistor M12 so that the driving voltage V1, V2, . . . , or Vr and the reference voltage GND can be alternately applied to the first sensor line TXL1.

The structures of a plurality of switches SW21, SW22, . . . , SW2r, . . . , SWq1, SWq2, . . . , SWqr, a plurality of transistors M21, M22, . . . , Mq1, and Mq2, and gate controllers GTC2, . . . , and GTCq that are connected to the other sensor lines TXL2 to TXLq are substantially the same as those described above; therefore, any repetitive detailed description thereof will be omitted.

Referring to FIG. 5, in an embodiment, the first sensor line TXL2 is longer than the first sensor line TXL1, the first sensor line TXL3 is longer than the first sensor line TXL2, the first sensor line TXL(q−1) is longer than the first sensor line TXL3, and the first sensor line TXLq is longer than the first sensor line TXL(q−1).

In such an embodiment, referring to FIG. 7, during the period p1a, the sensor driver 220 may transmit an offset signal that alternates between the driving voltage Vr and the reference voltage GND to the first sensor line TXLq. Hence, the voltage level of the driving signal that is applied to the first sensor line TXL1 having the smallest RC delay may match the voltage level of the offset signal that is applied to the first sensor line TXLq having the largest RC delay.

In such an embodiment, during the period p2a, the sensor driver 220 may apply an offset signal that alternates between a driving voltage less than the driving voltage Vr and the reference voltage GND to the first sensor line TXLq. During the period p3a, the sensor driver 220 may apply an offset signal that alternates between a driving voltage less than the driving voltage Vr in the period p2a and the reference voltage GND to the first sensor line TXLq. During the period p(q−1)a, the sensor driver 220 may apply an offset signal that alternates between the second driving voltage V2 and the reference voltage GND to the first sensor line TXL1. During the period pqa, the sensor driver 220 may apply an offset signal that alternates between the driving voltage V1 and the reference voltage GND to the first sensor line TXL1.

FIG. 9 illustrates an alternative embodiment of an offset signal transmitter RDC or a sensor transmitter TRDC that has a different structure from that shown in FIG. 8. In an embodiment, in each of the periods p1a to pqa, the offset signal transmitter RDC may transmit an offset signal that alternates between the driving voltage VDD and the reference voltage GND.

In an alternative embodiment, in each of the periods p1a to pqa, the sensor transmitter TRDC may transmit an offset signal that alternates between the driving voltage VDD and the reference voltage GND. In such an embodiment, in each of the periods p1a to pqa, the sensor transmitter TRDC may transmit a driving signal that alternates between the driving voltage VDD and the reference voltage GND.

Referring to FIG. 9, for each of the first sensor lines TXL1 to TXLq, the sensor driver 220 may include a first transistor, a second transistor, and a gate controller. Here, each of the first transistor and the second transistor may include sub-transistors connected in parallel to each other.

In an embodiment, for example, the first transistor M11 may include a first electrode configured to receive a driving voltage VDD, a second electrode connected to a first electrode of the second transistor M12, and a gate electrode connected to the gate controller GTC1. The second transistor M12 may include the first electrode connected to the second electrode of the first transistor M11, a second electrode configured to receive the reference voltage GND, and a gate electrode connected to the gate controller GTC1. The first transistor M11 may include a plurality of sub-transistors M11a, M11b, . . . , and M11c connected in parallel to each other. The second transistor M12 may include a plurality of sub-transistors M12a, M12b, . . . , and M12c connected in parallel to each other. The gate controller GTC1 may alternately turn on the first transistor M11 and the second transistor M12 so that the driving voltage VDD and the reference voltage GND can be alternately applied to the first sensor line TXL1. Here, the gate controller GTC1 may adjust the number of sub-transistors to be turned on, thus adjusting the slew rate of the driving signal or the offset signal. In such an embodiment, as the number of sub-transistors to be turned on is reduced, the slew rate of the driving signal or the offset signal may be reduced.

The structures of a plurality of transistors M21, M22, . . . , Mq1, and Mq2, and gate controllers GTC2, . . . , and GTCq that are connected to the other sensor lines TXL2 to TXLq are substantially the same as those described above; therefore, any repetitive detailed description thereof will be omitted.

In an embodiment where a first sensor line through which an offset signal is transmitted is longer than a first sensor line through which a driving signal is transmitted, the sensor driver 220 may set the slew rate of the offset signal to a value greater than the slew rate of the driving signal. In such an embodiment, during the period pia, the sensor driver 220 may alternately turn on the sub-transistor M11a and the sub-transistor M12a so that a driving signal that alternates between the driving voltage VDD and the reference voltage GND can be transmitted to the first sensor line TXL1. During the period pia, the sensor driver 220 may maintain the sub-transistors M11b, . . . , M11c, M12b, . . . , and M12c turned off. Here, during the period pia, the sensor driver 220 may alternately turn on the sub-transistor Mq1a, Mq1b, . . . , and Mq1c and the sub-transistor Mq2a, Mq2b, . . . , and Mq2c so that an offset signal that alternates between the driving voltage VDD and the reference voltage GND can be transmitted to the first sensor line TXLq. Therefore, the slew rate of the offset signal to be applied to the first sensor TX1 and the slew rate of the offset signal to be applied to the first sensor TXq may match with each other, so that the EMI can be effectively offset.

Referring to FIG. 5, in an embodiment, the first sensor line TXL2 is longer than the first sensor line TXL1, the first sensor line TXL3 is longer than the first sensor line TXL2, the first sensor line TXL(q−1) is longer than the first sensor line TXL3, and the first sensor line TXLq is longer than the first sensor line TXL(q−1).

In such an embodiment, referring to FIG. 7, during the period pia, the sensor driver 220 may apply a generated offset signal to the first sensor line TXLq in such a way to alternately turn on the sub-transistors Mq1a, Mq1b, . . . , and Mq1c and the sub-transistors Mq2a, Mq2b, . . . , and Mq2c. Hence, the slew rate of the driving signal that is applied to the first sensor line TXL1 having the smallest RC delay may match the slew rate of the offset signal that is applied to the first sensor line TXLq having the largest RC delay. In such an embodiment, as a difference in RC delay is increased, the number of sub-transistors to be used to generate an offset signal may be increased so that the slew rates can be matched with each other.

In such an embodiment, during the period p2a, the sensor driver 220 may transmit a generated offset signal to the first sensor line TXLq in such a way as to alternately turn on sub-transistors, the number of which is less than that in the period pia. During the period p3a, the sensor driver 220 may transmit a generated offset signal to the first sensor line TXLq in such a way to alternately turn on sub-transistors, the number of which is less than that in the period p2a. During the period p(q−1)a, the sensor driver 220 may apply an offset signal to the first sensor line TXL1 in such a way to alternately turn on the sub-transistors M11a and M11b and the sub-transistors M12a and M12b. During the period pqa, the sensor driver 220 may apply a generated offset signal to the first sensor line TXL1 in such a way to alternately turn on the sub-transistor M11a and the sub-transistor M12a.

Referring to FIG. 10, for each of the first sensor lines TXL1 to TXLq, the sensor driver 220 may include a plurality of switches, a plurality of transistors, and a gate controller. In an embodiment, for example, for the first sensor line TXL1, the sensor driver 220 may include a plurality of switches SW11, SW12, . . . , and SW1r, a plurality of transistors M11 and M12, and a gate controller GTC1.

The plurality of switches SW11, SW12, . . . , and SW1r may receive different driving voltages V1, V2, . . . , and Vr, respectively. The first transistor M11 may include a first electrode connected to the plurality of switches SW11, SW12, . . . , and SW1r, a second electrode connected to a first electrode of the second transistor M12, and a gate electrode connected to the gate controller GTC1. The second transistor M12 may include the first electrode connected to the second electrode of the first transistor M11, a second electrode configured to receive the reference voltage GND, and a gate electrode connected to the gate controller GTC1. The second electrode of the first transistor M11 and the first electrode of the second transistor M12 may be connected to the first sensor line TXL1. The gate controller GTC1 may alternately turn on the first transistor M11 and the second transistor M12 so that the driving voltage V1, V2, . . . , or Vr and the reference voltage GND can be alternately applied to the first sensor line TXL1.

The first transistor M11 may include a plurality of sub-transistors M11a, M11b, . . . , and M11c connected in parallel to each other. The second transistor M12 may include a plurality of sub-transistors M12a, M12b, . . . , and M12c connected in parallel to each other. The gate controller GTC1 may adjust the number of sub-transistors to be turned on, thus adjusting the slew rate of the driving signal or the offset signal. In such an embodiment, as the number of sub-transistors to be turned on is reduced, the slew rate of the driving signal or the offset signal may be reduced.

The structures of a plurality of transistors M21, M22, . . . , Mq1, and Mq2, and gate controllers GTC2, . . . , and GTCq that are connected to the other sensor lines TXL2 to TXLq are substantially the same as those described above; therefore, any repetitive detailed description thereof will be omitted.

In an embodiment where a first sensor line through which an offset signal is transmitted is longer than a first sensor line through which a driving signal is transmitted, the sensor driver 220 may set the voltage level of the offset signal to a value greater than the voltage level of the driving signal, and may set the slew rate of the offset signal to a value greater than the slew rate of the driving signal. With regard to each of the periods p1a to pqa of FIG. 7, selection of sub-transistors to be operated is substantially the same as that described above with reference to FIG. 9, and selection of a driving voltage to be used is substantially the same as that described above with reference to FIG. 8; therefore, any repetitive detailed description thereof will be omitted.

Figure 11:
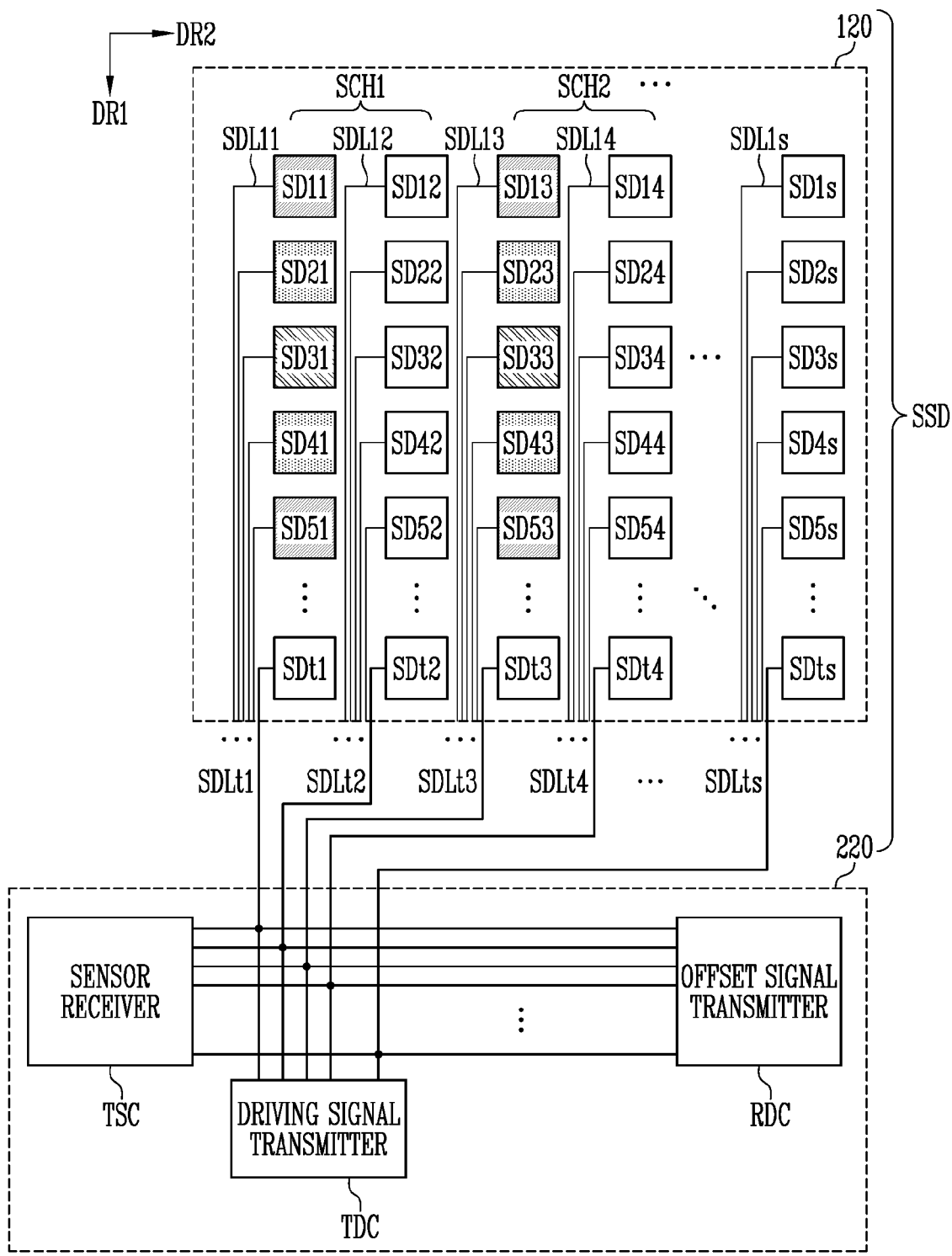
FIGS. 11 and 12 are diagrams for describing a sensor device in accordance with an embodiment of the disclosure.
Figure 12:
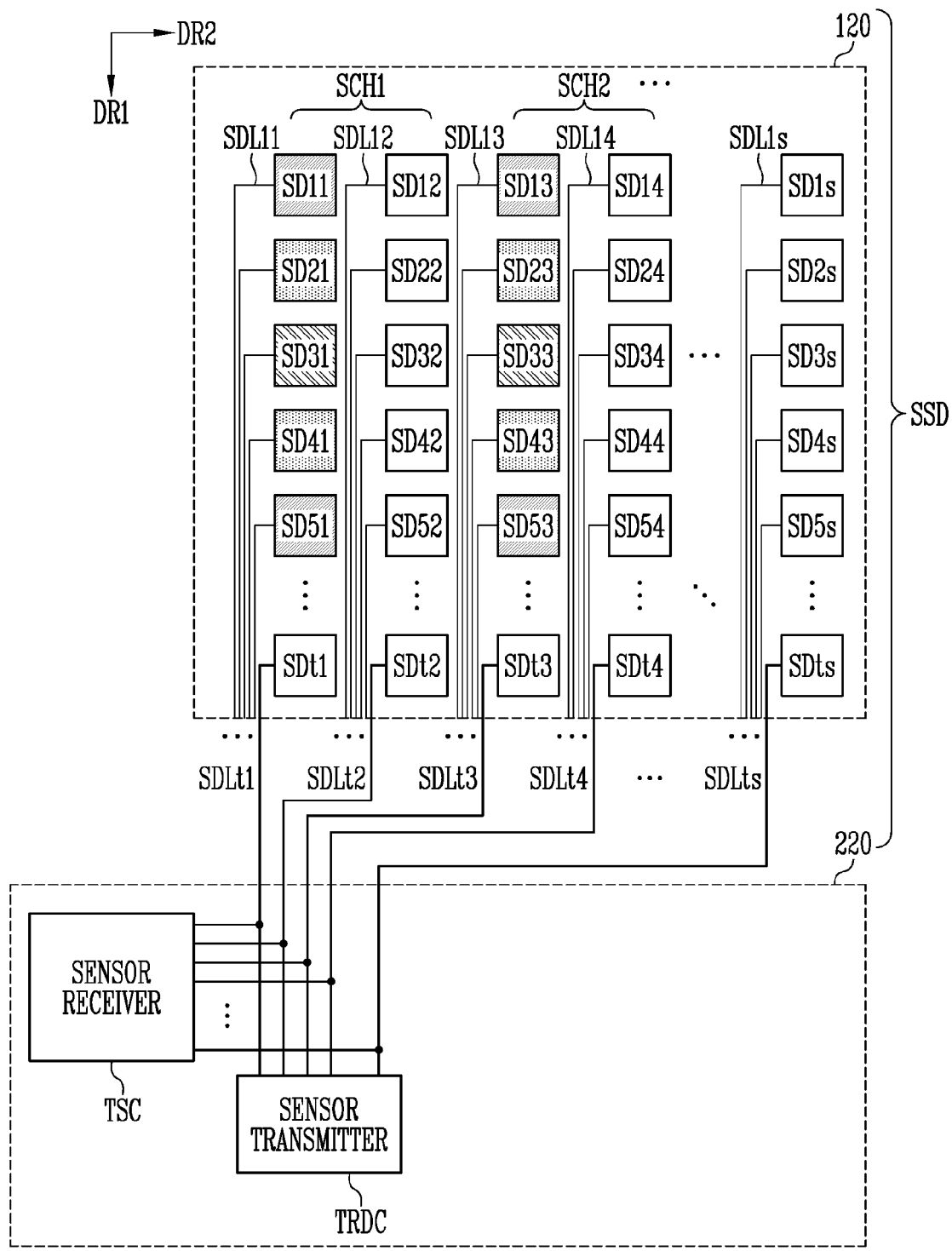

FIGS. 11 and 12 are diagrams for describing a sensor device SSD in accordance with an embodiment of the disclosure.

Referring to FIG. 11, the sensor device SSD in accordance with an embodiment of the disclosure may include a sensor component 120 and a sensor driver 220. The sensor device SSD may be included in the display device 1.

The sensor component 120 may include sensors SD11 to SDts. The sensors SD11 to SDts may be successively arranged in the first direction DR1 and the second direction DR2. For example, the sensors SD11 to SDts may be arranged in the form of a matrix. Here, s may be an integer greater than 0, and may refer to the number of columns of sensors SD11 to SDts that constitute the sensor component 120. Here, t may be an integer greater than 0, and may refer to the number of rows of sensors SD11 to SDts that constitute the sensor component 120. The sensors SD11 to SDts may be respectively connected to different sensor lines SDL11 to SDLt1, SDL12 to SDLt2, SDL13 to SDLt3, SDL14 to SDLt4, . . . , and SDL1s to SDLts.

In an embodiment, for example, the respective sensor lines SDL11 to SDLts may be connected to the corresponding sensors SD11 to SDts in a direction opposite to the second direction DR2, and extend in the first direction DR1.

In an embodiment, the sensor driver 220 may include a sensor receiver TSC, a driving signal transmitter TDC, and an offset signal transmitter RDC. The driving signal transmitter TDC may supply driving signals to the sensors SD11 to SDts through the sensor lines SDL11 to SDLts. The sensor receiver TSC may receive sensing signals from the sensors SD11 to SDts through the sensor lines SDL11 to SDLts. The offset signal transmitter RDC may supply offset signals to the sensors SD11 to SDts through the sensor lines SDL11 to SDLts.

In an embodiment, each of two columns of the sensors SD11 to SDts may be connected to one sensing channel. In an embodiment, for example, the sensors SD11, SD12, SD21, SD22, SD31, SD32, SD41, SD42, SD51, SD52, . . . , SDt1, and SDt2 may be connected to a sensing channel SCH1. In such an embodiment, the sensors SD13, SD14, SD23, SD24, SD33, SD34, SD43, SD44, SD53, SD54, . . . , SDt3, and SDt4 may be connected to a sensing channel SCH2. Different sensing channels SCH1, SCH2, . . . can be operated independently of each other, and may simultaneously perform sensing functions.

Referring to FIG. 12, in an alternative embodiment, the sensor driver 220 may include a sensor receiver TSC and a sensor transmitter TRDC. The sensor transmitter TRDC may supply driving signals or offset signals to the sensors SD11 to SDts. The offset signal transmitter RDC and the sensor transmitter TRDC of FIGS. 11 and 12 may have a same structure as that of the offset signal transmitter RDC and the sensor transmitter TRDC described above with reference to FIGS. 5 and 6; therefore, any repetitive detailed description thereof will be omitted (refer to FIGS. 8, 9, and 10).

Figure 13:
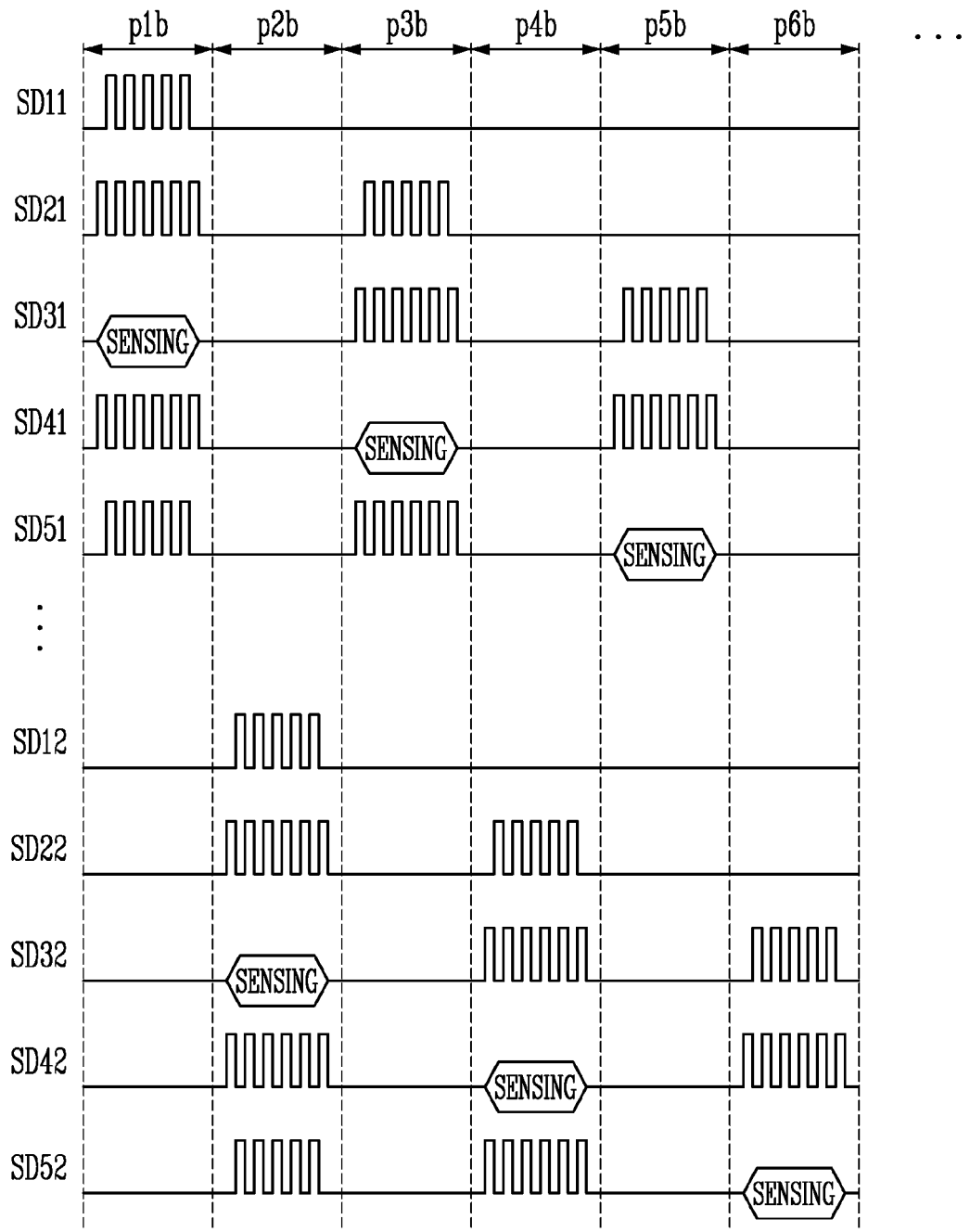
FIG. 13 is a diagram for describing a method of driving the sensor device of FIG. 11 or 12.

FIG. 13 is a diagram for describing a method of driving the sensor device of FIG. 11 or 12.

Hereinafter, the method will be described based on the sensing channel SCH1. Because the other sensing channels SCH2, . . . may perform a same operation as that of the sensing channel SCH1 during a same period, any repetitive detailed description thereof will be skipped. Referring to FIGS. 11, 12, and a period p1$b$ of FIG. 13, the sensor driver 220 may transmit driving signals to some sensors SD21 and SD41 among the sensors SD11 to SDts through the sensor lines SDL11 to SDLts, and may receive a sensing signal from the sensor SD31 adjacent to the sensors SD21 and SD41 to which the driving signals are transmitted. Here, the sensor SD31 that transmits the sensing signal may be located in the first direction DR1 and a direction opposite to the first direction DR1 from the sensors SD21 and SD41 that receive the driving signals. In an embodiment where the extension direction of the sensor lines is the first direction DR1, parasitic capacitance may be offset due to signals having a same phase on the sensing lines connected to the sensors SD21, SD31, and SD41. In a case where a touch is made by the user, the magnitude of a received sensing signal is reduced. Consequently, the sensor driver 220 may detect whether the touch of the user is present.

Furthermore, during each period p1$b$ for transmission of driving signals, the sensor driver 220 may transmit an offset signal that is identical in frequency to and different in phase from the driving signals to at least one sensor SD11, SD51 among the sensors that neither receive the driving signals nor transmit sensing signals. In an embodiment, for example, a distance between the sensor SD11 that receives an offset signal and the sensor SD31 that transmits a sensing signal may be greater than a distance between the sensor SD21 that receives a driving signal and a sensor SD31 that transmits a sensing signal. In an embodiment, for example, other sensors may not be located between the sensor SD21 that receives the driving signal and the sensor SD31 that transmits a sensing signal, and other sensors may not be located between the sensor SD11 that receives the offset signal and the sensor SD21 that receives the driving signal.

Here, the sensor driver 220 may set at least one selected from the slew rate and the voltage level of the offset signal to a value different from that of the corresponding driving signal. The setting of the slew rate and the voltage level is the same as those described with reference to FIGS. 8 to 10; therefore, any repetitive detailed description thereof will be omitted.

Next, during the period p2$b$, the sensor driver 220 may transmit driving signals to some sensors SD22 and SD42 among the sensors SD11 to SDts through the sensor lines SDL11 to SDLts, and may receive a sensing signal from the sensor SD32 adjacent to the sensors SD22 and SD42 to which the driving signals are transmitted. Furthermore, during each period p2$b$ for transmission of driving signals, the sensor driver 220 may transmit an offset signal that is identical in frequency to and different in phase from the driving signals to at least one sensor SD12, SD52 among the sensors that neither receive the driving signals nor transmit sensing signals.

Next, during the period p3$b$, the sensor driver 220 may transmit driving signals to some sensors SD31 and SD51 among the sensors SD11 to SDts through the sensor lines SDL11 to SDLts, and may receive a sensing signal from the sensor SD41 adjacent to the sensors SD31 and SD51 to which the driving signals are transmitted. Furthermore, during each period p3$b$ for transmission of driving signals, the sensor driver 220 may transmit an offset signal that is identical in frequency to and different in phase from the driving signals to at least one sensor SD21, . . . among the sensors that neither receive the driving signals nor transmit sensing signals.

Next, during the period p4$b$, the sensor driver 220 may transmit driving signals to some sensors SD32 and SD52 among the sensors SD11 to SDts through the sensor lines SDL11 to SDLts, and may receive a sensing signal from the sensor SD42 adjacent to the sensors SD32 and SD52 to which the driving signals are transmitted. Furthermore, during each period p4$b$ for transmission of driving signals, the sensor driver 220 may transmit an offset signal that is identical in frequency to and different in phase from the driving signals to at least one sensor SD22, . . . among the sensors that neither receive the driving signals nor transmit sensing signals.

Next, during the period p5$b$, the sensor driver 220 may transmit driving signals to some sensors SD41, . . . among the sensors SD11 to SDts through the sensor lines SDL11 to SDLts, and may receive a sensing signal from the sensor SD51 adjacent to the sensors SD41, . . . to which the driving signals are transmitted. Furthermore, during each period p5$b$ for transmission of driving signals, the sensor driver 220 may transmit an offset signal that is identical in frequency to and different in phase from the driving signals to at least one sensor SD31, . . . among the sensors that neither receive the driving signals nor transmit sensing signals.

Next, during the period p6$b$, the sensor driver 220 may transmit driving signals to some sensors SD42, . . . among the sensors SD11 to SDts through the sensor lines SDL11 to SDLts, and may receive a sensing signal from the sensor SD52 adjacent to the sensors SD42, . . . to which the driving signals are transmitted. Furthermore, during each period p6$b$ for transmission of driving signals, the sensor driver 220 may transmit an offset signal that is identical in frequency to and different in phase from the driving signals to at least one sensor SD32, . . . among the sensors that neither receive the driving signals nor transmit sensing signals.

The sensing method of the sensor device SSD of FIGS. 11 and 12 is not limited to that described with reference to the timing diagram of FIG. 13, and may be changed in various ways.

Various embodiments of the disclosure may provide a sensor device capable of minimizing electromagnetic interference (EMI) without a change in frequency band of a driving signal of the sensor device.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A sensor device comprising:
   first sensors;
   second sensors which forms a capacitance with the first sensors; and
   a sensor driver which transmits driving signals to the first sensors through first sensor lines, and receives sensing signals from the second sensors through second sensor lines,
   wherein the sensor driver sequentially transmits the driving signals to the first sensors, and transmits, during each period of transmitting the driving signals, an offset signal to at least one selected from the first sensors which does not receive the driving signals,
   wherein the offset signal is identical in frequency to and different in phase from the driving signals, and
   wherein the sensor driver sets at least one selected from a slew rate and a voltage level of the offset signal to a value different from a corresponding value of a corresponding driving signal.

2. The sensor device according to claim 1, wherein a length of a first sensor line, through which the corresponding driving signal is transmitted, is different from a length of a first sensor line through which the offset signal is transmitted.

3. The sensor device according to claim 1, wherein, in a case where a first sensor line through which the offset signal is transmitted is longer than a first sensor line through which the corresponding driving signal is transmitted, the sensor driver sets the voltage level of the offset signal to be greater than a voltage level of the corresponding driving signal.

4. The sensor device according to claim 3, wherein, for each of the first sensor lines, the sensor driver comprises:
   a plurality of switches which receives different driving voltages, respectively;
   a first transistor including a first electrode connected to the plurality of switches;
   a second transistor including a first electrode connected to a second electrode of the first transistor, and a second electrode which receives a reference voltage; and
   a gate controller connected to a gate electrode of the first transistor and a gate electrode of the second transistor.

5. The sensor device according to claim 1, wherein, in a case where a first sensor line through which the offset signal is transmitted is longer than a first sensor line through which the corresponding driving signal is transmitted, the sensor driver sets the slew rate of the offset signal to be greater than a slew rate of the corresponding driving signal.

6. The sensor device according to claim 5,
   wherein, for each of the first sensor lines, the sensor driver comprises:
   a first transistor including a first electrode which receives a driving voltage;
   a second transistor including a first electrode connected to a second electrode of the first transistor, and a second electrode which receives a reference voltage; and
   a gate controller connected to a gate electrode of the first transistor and a gate electrode of the second transistor,
   wherein the first transistor comprises a plurality of sub-transistors connected in parallel to each other, and
   wherein the second transistor comprises a plurality of sub-transistors connected in parallel to each other.

7. The sensor device according to claim 1, wherein, in a case where a first sensor line through which the offset signal is transmitted is longer than a first sensor line through which the corresponding driving signal is transmitted, the sensor driver sets the voltage level of the offset signal to be greater than a voltage level of the driving signal, and sets the slew rate of the offset signal to be greater than a slew rate of the driving signal.

8. The sensor device according to claim 7,
   wherein, for each of the first sensor lines, the sensor driver comprises:
   a plurality of switches which receives different driving voltages, respectively;
   a first transistor including a first electrode connected to the plurality of switches;
   a second transistor including a first electrode connected to a second electrode of the first transistor, and a second electrode which receives a reference voltage; and
   a gate controller connected to a gate electrode of the first transistor and a gate electrode of the second transistor,
   wherein the first transistor comprises a plurality of sub-transistors connected in parallel to each other, and
   wherein the second transistor comprises a plurality of sub-transistors connected in parallel to each other.

9. The sensor device according to claim 1, wherein, among the first sensors, a first sensor to which the offset signal is transmitted is a sensor farthest from a first sensor to which the corresponding driving signal is transmitted.

10. The sensor device according to claim 1, wherein a first sensor to which the offset signal is transmitted is a first one or the last one among the first sensors.

11. A sensor device comprising:
    sensors; and
    a sensor driver which transmits driving signals to at least two sensors among the sensors through sensor lines, and receives sensing signals from other sensors adjacent to the at least two sensors to which the driving signals are transmitted,
    wherein the sensor driver transmits, during each period of transmitting the driving signals, an offset signal to at least one selected from sensors which neither receive the driving signals nor transmit the sensing signals among the sensor,
    wherein the offset signal is identical in frequency to and different in phase from the driving signals, and
    wherein the sensor driver sets a slew rate of the offset signal to a value different from a corresponding value of a corresponding driving signal.

12. The sensor device according to claim 11, wherein a length of a sensor line through which the corresponding driving signal is transmitted is different from a length of a sensor line through which the offset signal is transmitted.

13. The sensor device according to claim 11, wherein, in a case where a sensor line through which the offset signal is transmitted is longer than a sensor line through which the corresponding driving signal is transmitted, the sensor driver sets the slew rate of the offset signal to be greater than a slew rate of the driving signal.

14. The sensor device according to claim 13,
wherein, for each of the sensor lines, the sensor driver comprises:
a first transistor including a first electrode which receives a driving voltage;
a second transistor including a first electrode connected to a second electrode of the first transistor, and a second electrode which receives a reference voltage; and
a gate controller connected to a gate electrode of the first transistor and a gate electrode of the second transistor,
wherein the first transistor comprises a plurality of sub-transistors connected in parallel to each other, and
wherein the second transistor comprises a plurality of sub-transistors connected in parallel to each other.

15. The sensor device according to claim 11, wherein a distance between a sensor which receives the offset signal and a sensor which transmits the sensing signal is greater than a distance between a sensor which receives the corresponding driving signal and the sensor which transmits the sensing signal.

16. The sensor device according to claim 15,
wherein no sensor is located between the sensor which receives the corresponding driving signal and the sensor which transmits the sensing signal, and
wherein no sensor is located between the sensor which receives the offset signal and the sensor which receives the corresponding driving signal.

17. A sensor device comprising:
sensors; and
a sensor driver which transmits driving signals to at least two sensors among the sensors through sensor lines, and receives sensing signals from other sensors adjacent to the at least two sensors to which the driving signals are transmitted,
wherein the sensor driver transmits, during each period of transmitting the driving signals, an offset signal to at least one selected from sensors which neither receive the driving signals nor transmit the sensing signals among the sensors,
wherein the offset signal is identical in frequency to and different in phase from the driving signals,
wherein the sensor driver sets at least one selected from a slew rate and a voltage level of the offset signal to a value different from a corresponding value of a corresponding driving signal, and
wherein, in a case where a sensor line through which the offset signal is transmitted is longer than a sensor line through which the corresponding driving signal is transmitted, the sensor driver sets the voltage level of the offset signal to be greater than a voltage level of the driving signal.

18. The sensor device according to claim 17, wherein, for each of the sensor lines, the sensor driver comprises:
a plurality of switches which receives different driving voltages, respectively;
a first transistor including a first electrode connected to the plurality of switches;
a second transistor including a first electrode connected to a second electrode of the first transistor, and a second electrode which receives a reference voltage; and
a gate controller connected to a gate electrode of the first transistor and a gate electrode of the second transistor.

19. The sensor device according to claim 17, wherein, in the case where the sensor line through which the offset signal is transmitted is longer than the sensor line through which the corresponding driving signal is transmitted, the sensor driver further sets the slew rate of the offset signal to be greater than a slew rate of the driving signal.

20. The sensor device according to claim 19,
wherein, for each of the sensor lines, the sensor driver comprises:
a plurality of switches which receives different driving voltages, respectively;
a first transistor including a first electrode connected to the plurality of switches;
a second transistor including a first electrode connected to a second electrode of the first transistor, and a second electrode which receives a reference voltage; and
a gate controller connected to a gate electrode of the first transistor and a gate electrode of the second transistor,
wherein the first transistor comprises a plurality of sub-transistors connected in parallel to each other, and
wherein the second transistor comprises a plurality of sub-transistors connected in parallel to each other.

* * * * *